US011921444B2

(12) United States Patent

Matsumoto et al.

(10) Patent No.: US 11,921,444 B2

(45) Date of Patent: Mar. 5, 2024

(54) TRANSFER UNIT AND IMAGE FORMING APPARATUS

(71) Applicant: CANON KABUSHIKI KAISHA, Tokyo (JP)

(72) Inventors: Norihiro Matsumoto, Yokohama (JP); Yuichiro Inaba, Chigasaki (JP); Akinori Mitsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/871,761

(22) Filed: Jul. 22, 2022

(65) Prior Publication Data

US 2022/0357692 A1 Nov. 10, 2022

Related U.S. Application Data

(63) Continuation of application No. 16/927,252, filed on Jul. 13, 2020, now Pat. No. 11,435,679.

(30) Foreign Application Priority Data

Jul. 16, 2019 (JP) ................................ 2019-131443

(51) Int. Cl.

*G03G 15/16* (2006.01)

*G03G 15/00* (2006.01)

(52) U.S. Cl.

CPC ..... *G03G 15/1615* (2013.01); *G03G 15/6511* (2013.01); *G03G 2215/1623* (2013.01)

(58) Field of Classification Search

CPC ............. G03G 15/095; G03G 15/1615; G03G 15/168; G03G 15/6511

USPC ........ 399/107, 110, 121, 297–303, 308–312, 399/381, 388

See application file for complete search history.

(56) References Cited

U.S. PATENT DOCUMENTS 10,108,136 B2 * 10/2018 Yamashita ............. G03G 21/10

FOREIGN PATENT DOCUMENTS

JP H11-003015 A 1/1999
JP 2005-316082 A 11/2005
JP 2017-102155 A 6/2017

* cited by examiner

*Primary Examiner* — Hoan H Tran

(74) *Attorney, Agent, or Firm* — Canon U.S.A., Inc. I.P. Division

(57) ABSTRACT

A belt unit, for use in an image forming apparatus, includes an endless belt that moves in a movement direction, a transfer member, a collecting member, a storage container, and a conveyance member. The conveyance member conveys toner in a conveyance direction, rotates about a rotational axis extending in a rotational axis direction, includes a shaft and a conveyance portion provided on a shaft outer surface, and has a helical shape having a helical axis extending in the rotational axis direction. The conveyance member further includes a protruding portion protruding from the shaft outer surface in a direction crossing the conveyance member rotational axis, which has a shape different from the helical shape, and which is provided on a shaft portion downstream of the conveyance portion in the conveyance direction. The rotational axis direction is a direction crossing both the endless belt movement direction and a transfer member longitudinal direction.

24 Claims, 15 Drawing Sheets

TRANSFER UNIT AND IMAGE FORMING APPARATUS

CROSS-REFERENCE TO RELATED APPLICATIONS

The present application is a continuation of U.S. patent application Ser. No. 16/927,252, filed on Jul. 13, 2020, which claims priority from Japanese Patent Application No. 2019-131443 filed Jul. 16, 2019, which are hereby incorporated by reference herein in their entireties.

BACKGROUND

Field of the Invention

Aspects of the present disclosure generally relate to an electrophotographic-type image forming apparatus, such as a copying machine or a printer.

Description of the Related Art

Known electrophotographic-type image forming apparatuses include an image forming apparatus of the tandem type configured such that a plurality of image forming units is arranged in turn with respect to the movement direction of a belt, such as a conveyance belt or an intermediate transfer belt. Each of the image forming units, which are provided for the respective colors, includes a drum-shaped photosensitive member (hereinafter referred to as a "photosensitive drum") serving as an image bearing member. Toner images borne on the photosensitive drums for respective colors are transferred to a transfer material, such as paper or overhead transparency (OHP) sheet, which is conveyed by a transfer material conveyance belt or are transferred to a transfer material after being once transferred to an intermediate transfer belt, and are then fixed to the transfer material by a fixing unit.

The belt, such as a conveyance belt or an intermediate transfer belt, in the state obtained after toner images have been transferred to the transfer material may have some of toner which has not been transferred remaining thereon as a residue, and such residual toner is then recovered by a recovery unit, which is mounted in the image forming apparatus, into a storage container which is configured to store residual toner. This enables, in a succeeding image forming process, preventing or reducing an image defect which occurs due to residual toner being transferred to the transfer material.

Japanese Patent Application Laid-Open No. 2005-257813 discusses a configuration which locates an encoder, which rotates integrally with a conveyance member which conveys toner inside a storage container, outside the storage container to detect slowing-down of rotation of the conveyance member, thereby detecting that the inside of the storage container has been brought into a full-storage state by residual toner. More specifically, in the configuration discussed in Japanese Patent Application Laid-Open No. 2005-257813, when, as the filling rate of residual toner increases, the inside of the storage container enters a full-storage state, the rotation of the conveyance member slows down by receiving resistance from residual toner having filled the storage container. When the rotation of the conveyance member slows down, a decrease in speed of the encoder, which rotates integrally with the conveyance member, is detected by a sensor, so that the storage container being in a full-storage state becomes able to be detected.

However, in the configuration which detects a full-storage state of the storage container by detecting slowing-down of the conveyance member as discussed in Japanese Patent Application Laid-Open No. 2005-257813, for example, in a case where resistance received from residual toner is small, it may become difficult to detect the full-storage state with a high degree of accuracy.

SUMMARY

Aspects of the present disclosure are generally directed to locating a conveyance member, which conveys toner, inside a storage container, which stores residual toner, and detecting a full-storage state of the storage container based on rotation of the conveyance member.

According to an aspect of the present disclosure, a transfer unit provided in an image forming apparatus having an image bearing member configured to bear a toner image, the transfer unit comprising: an endless belt configured to be movable and to be kept in contact with the image bearing member, a transfer member configured to transfer the toner image from the image bearing member to the endless belt, a collecting member configured to be in abutting contact with the endless belt and to recover toner remaining on the endless belt, a storage container located in a region configured by an inner circumferential surface of the endless belt and including an inflow port through which toner recovered by the collecting member may flow, a bottom surface configured to support toner having flowed into the storage container through the inflow port, and a top surface which faces the bottom surface, a conveyance member including a conveyance portion which has a helical shape with respect to a rotational axis direction and configured to rotate to convey toner from the inflow port inside the storage container, and a detection unit configured to detect a load which the conveyance member receives when rotating, wherein the rotational axis direction is a direction which is perpendicular to neither a movement direction of the endless belt nor a width direction perpendicular to the movement direction of the endless belt, and wherein the conveyance member further includes a force receiving portion configured to receive a force from toner conveyed by the conveyance portion in a state the conveyance member is rotating.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. However, for example, the dimensions, materials, shapes, and relative locations of constituent components described in the following exemplary embodiments are those which are to be altered or modified as appropriate according to configurations of apparatuses to which the aspects of the disclosure are applied and various conditions. Accordingly, unless specifically described otherwise, the following exemplary embodiments should not be construed to limit the scope of the disclosure.

[Configuration of Image Forming Apparatus]

Figure 1:
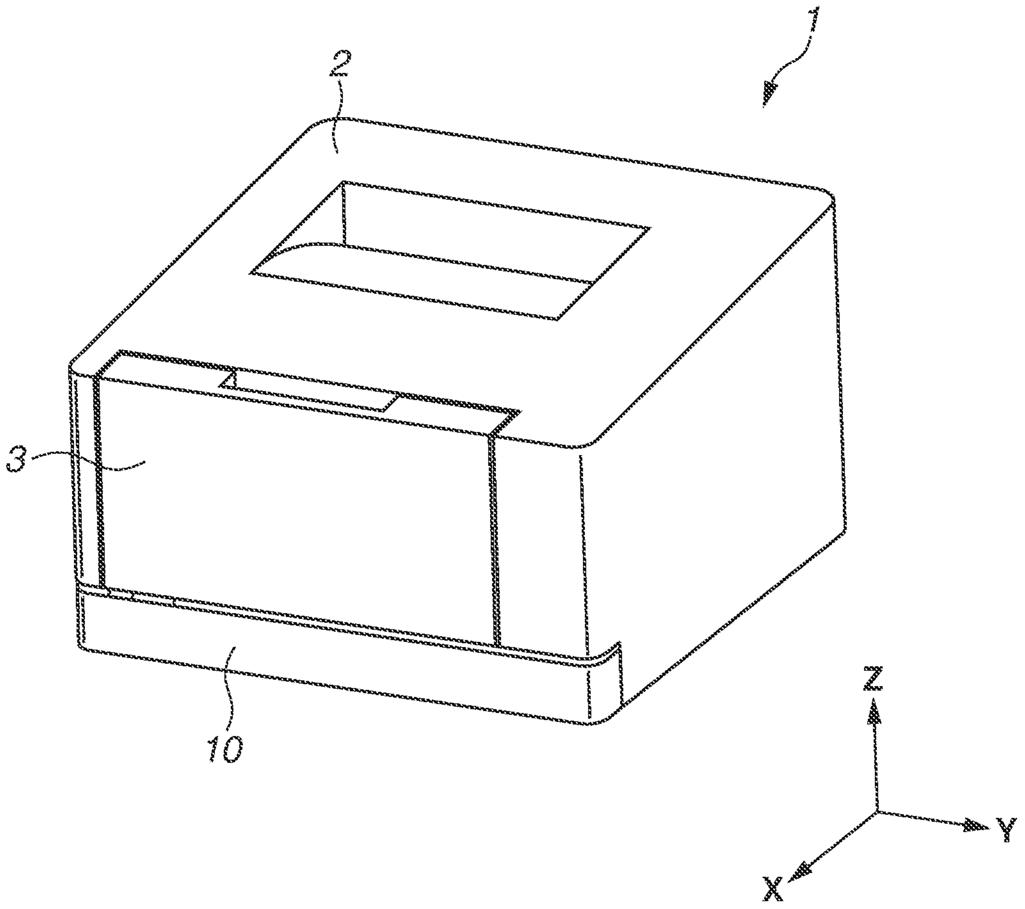
FIG. 1 is a schematic perspective view illustrating an external appearance configuration of an image forming apparatus in a first exemplary embodiment.
Figure 2:
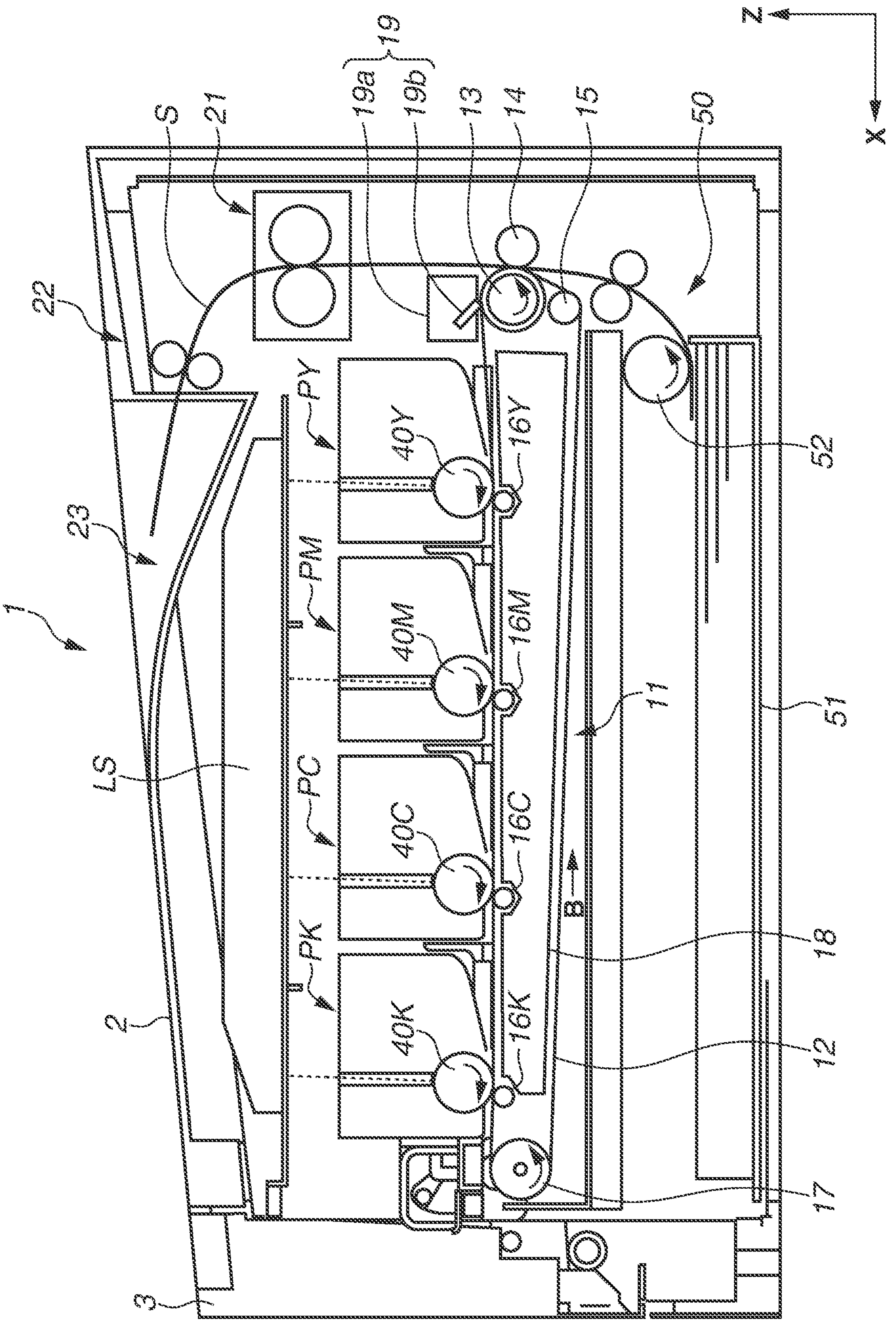
FIG. 2 is a schematic sectional view illustrating an internal configuration of the image forming apparatus in the first exemplary embodiment.

FIG. 1 is a schematic perspective view illustrating an external appearance configuration of an image forming apparatus 1 in a first exemplary embodiment, and FIG. 2 is a schematic sectional view illustrating an internal configuration of the image forming apparatus 1. The image forming apparatus 1 in the first exemplary embodiment is what is called a tandem-type image forming apparatus including a plurality of image forming units PY, PM, PC, and PK. The first image forming unit PY forms an image with toner of yellow (Y), the second image forming unit PM forms an image with toner of magenta (M), the third image forming unit PC forms an image with toner of cyan (C), and the fourth image forming unit PK forms an image with toner of black (Bk)

Moreover, the image forming apparatus 1 is of the process cartridge type, and each of the plurality of image forming units PY, PM, PC, and PK is configured as a process cartridge and is thus attachable to and detachable from an apparatus body 2. Furthermore, attachment and detachment of each process cartridge are performed in a state in which an opening-closing door 3 provided in the image forming apparatus 1 is opened. As illustrated in FIG. 2, these four image forming units are arranged in a line at predetermined intervals, and configurations of the respective image forming units have many portions which are in substantially common except for colors of toners stored therein. Accordingly, in the following description, in a case where distinctions are not particularly required, suffixes Y, M, C, and K of reference characters denoting elements for the respective colors are omitted, and these elements are comprehensively described.

Moreover, in the following description, with regard to the image forming apparatus 1, a side on which the opening-closing door 3 is provided is assumed to be a front side (front surface), and a side opposite to the front side is assumed to be a back side (rear surface). Moreover, when viewed from the front side, the right side of the image forming apparatus 1 is referred to as a driving side and the left side thereof is referred to as a non-driving side. Furthermore, in each drawing, a direction leading from the back side of the apparatus body 2 to the front side thereof is defined as an X-axis direction, a direction leading from the non-driving side of the apparatus body 2 to the driving side thereof is defined as a Y-axis direction, and a direction leading from the bottom surface of the apparatus body 2 to the top surface thereof is defined as a Z-axis direction.

As illustrated in FIG. 2, the respective image forming units P are horizontally aligned in parallel with the bottom surface of the apparatus body 2. The image forming unit P includes an electrophotographic process mechanism, and receives a rotary driving force transmitted from a cartridge driving transmission unit (not illustrated) provided in the apparatus body 2. The image forming unit P includes a photosensitive drum 40, which serves as an image bearing member configured to bear a toner image, a charging unit (not illustrated), and a developing unit (not illustrated).

Then, an exposure unit LS is provided above the image forming units P with respect to the Z-axis direction, and the exposure unit LS outputs laser light corresponding to image information which a controller (not illustrated) has received. The laser light output from the exposure unit LS passes through an exposure window portion of the image forming unit P and acts to scan and expose the surface of the photosensitive drum 40.

Moreover, a transfer unit 11 is provided below the image forming units P with respect to the Z-axis direction. The transfer unit 11 includes an intermediate transfer belt 12 of the endless shape, which is movable, primary transfer rollers 16, a driving roller 13, a tensile suspension roller 17, a tensile suspension roller 15, a recovery unit 19, and a storage container 18. Upon receiving a driving force, the driving roller 13 rotates to move the intermediate transfer belt 12 in a direction indicated by arrow B illustrated in FIG. 2, and suspends the intermediate transfer belt 12 in a tensioned manner in conjunction with the tensile suspension roller 17 and the tensile suspension roller 15. The recovery unit 19 recovers toner which has remained on the intermediate transfer belt 12, and toner recovered by the recovery unit 19 is then stored in the storage container 18, which is provided inside a region configured with the inner circumferential surface of the intermediate transfer belt 12.

The primary transfer rollers 16 are transfer portions which operate to transfer toner images borne on the respective photosensitive drums 40 to the intermediate transfer belt 12 from the photosensitive drums 40, and are configured to be in contact with the inner circumferential surface of the intermediate transfer belt 12. The primary transfer rollers 16Y, 16M, 16C, and 16K are provided in association with the respective photosensitive drums 40Y, 40M, 40C, and 40K via the intermediate transfer belt 12. Each primary transfer roller 16 is provided in such a way as to extend in a direction perpendicular to the direction indicated by arrow B illustrated in FIG. 2, i.e., in the Y-axis direction, and is configured to urge the intermediate transfer belt 12 toward each photosensitive drum 40, thus forming a primary transfer portion in which the photosensitive drum 40 and the intermediate transfer belt 12 are in contact with each other.

In the first exemplary embodiment, each primary transfer roller 16 is a metallic roller having no elastic layer. A primary transfer roller configured with a metallic roller is inexpensive in terms of cost but may abrade an opposite member due to having a high degree of hardness. Therefore, in the configuration of the first exemplary embodiment, as illustrated in FIG. 2, each primary transfer roller 16 is located at a position shifting from the position of each primary transfer portion in which each photosensitive drum 40 and the intermediate transfer belt 12 are in contact with each other. More specifically, with respect to the movement direction of the intermediate transfer belt 12, each primary transfer roller 16 is located at a position shifting to the downstream side from the position of each primary transfer portion. Furthermore, each primary transfer roller 16 can be configured to be located at a position shifting to the upstream side from the position of each primary transfer portion.

The recovery unit 19 includes a housing 19*a* and a cleaning blade 19*b* (collecting member), which is provided inside the housing 19*a* and extends along the Y-axis direction. The cleaning blade 19*b* is located in such a way as to be in abutting contact with the outer circumferential surface of the intermediate transfer belt 12 in a counter direction which is opposite to the movement direction of the intermediate transfer belt 12, and acts to recover toner having remained on the intermediate transfer belt 12 into the housing 19*a*.

A secondary transfer roller 14 is located at a position facing the driving roller 13 (driving rotation member) via the intermediate transfer belt 12, so that a secondary transfer portion is formed at a position in which the secondary transfer roller 14 and the intermediate transfer belt 12 are in abutting contact with each other. Moreover, with regard to the conveyance direction of a transfer material S, a feeding unit 50 including a sheet feeding cassette 51, which stores transfer materials S, and a sheet feeding roller 52, which feeds a transfer material S from the sheet feeding cassette 51 to the secondary transfer portion, is provided on the upstream side of the secondary transfer portion.

With regard to the movement direction of a transfer material S, a fixing unit 21, which fixes a toner image to a transfer material S, and a discharge roller pair 22, which discharges a transfer material S having a toner image fixed thereto from the apparatus body 2, are provided at the downstream side of the secondary transfer portion. Transfer materials S discharged by the discharge roller pair 22 from the apparatus body 2 are stacked on a sheet discharge tray 23. [Image Forming Operation]

Next, an image forming operation of the image forming apparatus 1 according to the first exemplary embodiment is described. The image forming operation is started by a control unit (not illustrated), such as a controller, receiving an image signal, so that, for example, the photosensitive drums 40 and the driving roller 13 starts rotating at a predetermined circumferential velocity (process speed) in response to a driving force transmitted from a drive source M (not illustrated).

The surface of the photosensitive drum 40 is electrically charged by a charging unit (not illustrated) in a uniform manner to the same polarity as the normal charging polarity of toner (in the first exemplary embodiment, negative polarity). After that, the photosensitive drum 40 is irradiated with laser light emitted from the exposure unit LS, so that an electrostatic latent image corresponding to image information is formed on the photosensitive drum 40. Then, the electrostatic latent image formed on the photosensitive drum 40 is developed with toner stored in the developing unit (not illustrated), so that a toner image corresponding to image information is borne on the surface of the photosensitive drum 40. At this time, toner images corresponding to image components for respective colors, i.e., yellow, magenta, cyan, and black, are borne on the respective photosensitive drums 40Y, 40M, 40C, and 40K.

After that, the toner images for the respective colors borne on the respective photosensitive drums 40 arrive at the respective primary transfer portions in conjunction with the rotations of the respective photosensitive drums 40. Then, voltages are applied from a power source (not illustrated) to the respective primary transfer rollers 16, so that the toner images for the respective colors borne on the respective photosensitive drums 40 are primarily transferred, at the respective primary transfer portions, to the intermediate transfer belt 12 sequentially in a superimposed manner. This leads to a formation of four-color toner images corresponding to the intended or predetermined color image on the intermediate transfer belt 12.

After that, the four-color toner images borne on the intermediate transfer belt 12 arrive at the secondary transfer portion in conjunction with the movement of the intermediate transfer belt 12 and are then secondarily transferred in a collective manner to the surface of a transfer material S, such as paper or overhead transparency (OHP) sheet, in the process of passing through the secondary transfer portion. At this time, a voltage with a polarity opposite to the normal charging polarity of toner is applied to the secondary transfer roller 14 from a secondary transfer power source (not illustrated).

A transfer material S stored in the sheet feeding cassette 51 is fed by the sheet feeding roller 52 from the sheet feeding cassette 51 at predetermined timing, and is then conveyed toward the secondary transfer portion. Then, the transfer material S having the four-color toner images transferred thereto at the secondary transfer portion is heated and pressed at the fixing unit 21, so that the four-color toner images are fixed to the transfer material S with toners of four colors fused and mixed in color. After that, the transfer material S is discharged from the apparatus body 2 by the discharge roller pair 22 and is then stacked on the sheet discharge tray 23, which serves as a stacking portion.

Toner having remained on the intermediate transfer belt 12 after completion of secondary transfer (hereinafter referred to as "transfer residual toner") is removed from the surface of the intermediate transfer belt 12 by the recovery unit 19, which is provided opposite to the driving roller 13 via the intermediate transfer belt 12. In the image forming apparatus 1 according to the first exemplary embodiment, the above-described operation leads to a formation of a full-color printed image.

Furthermore, the image forming apparatus 1 according to the first exemplary embodiment is equipped with a controller (not illustrated), which is configured to control operations of the respective units included in the image forming apparatus 1, and a memory, which serves as a storage unit storing various pieces of control information. The controller performs, for example, control concerning conveyance of transfer materials S, control concerning driving of the intermediate transfer belt 12 and the respective image forming units P serving as process cartridges, control concerning image formation, and control concerning fault detection. [Recovery of Transfer Residual Toner by Recovery Unit]

Transfer residual toner having remained on the intermediate transfer belt 12 after the completion of secondary transfer is physically scraped from the intermediate transfer belt 12 by the cleaning blade 19*b* and is then temporarily stored in the housing 19*a* of the recovery unit 19. In the following description, a recovery process for transfer residual toner which is performed by the recovery unit 19 is described.

Figure 3:
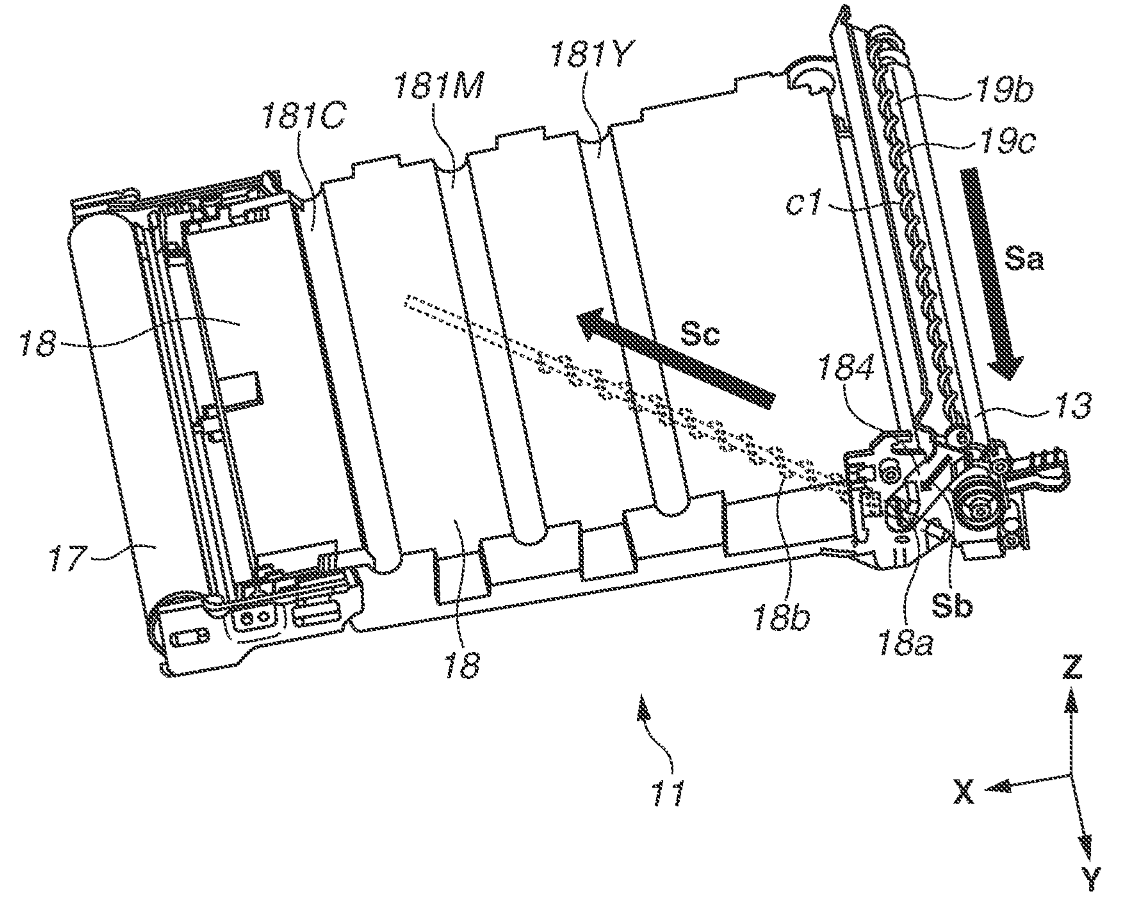
FIG. 3 is a schematic perspective view illustrating a configuration of a transfer unit in the first exemplary embodiment.

FIG. 3 is a schematic perspective view illustrating a configuration of the transfer unit 11 in a state in which the intermediate transfer belt 12 is removed for ease of explanation. Thick arrows illustrated in FIG. 3 indicate a conveyance route for transfer residual toner recovered by the cleaning blade 19*b*. Furthermore, to illustrate an internal configuration of the recovery unit 19, in FIG. 3, the housing 19*a* is omitted from illustration. The recovery unit 19 includes, inside the housing 19*a*, the cleaning blade 19*b* and a conveyance member 19*c*, which conveys transfer residual toner scraped from the intermediate transfer belt 12 by the cleaning blade 19*b*. The conveyance member 19*c* includes a conveyance portion c1 which is in the shape of a helix in the axial direction of a rotational axis thereof, and is configured to rotate upon receiving a driving force from a drive source (not illustrated), thus conveying transfer residual toner in the direction of arrow Sa illustrated in FIG. 3 (i.e., the Y-axis direction).

After that, the transfer residual toner which has been conveyed in the direction of arrow Sa illustrated in FIG. 3 indie the housing 19*a* is then conveyed in the direction of arrow Sb illustrated in FIG. 3 in a conveyance path 184 provided adjacent to the downstream end portion side about the toner conveyance direction by the conveyance member 19*c*, in other words, the driving-side end portion of the transfer unit 11. The conveyance path 184 is coupled to an inflow port 18*a* of the storage container 18. Moreover, the inside of the storage container 18 is provided with a conveyance member 18*b*, one end side of which is located near the inflow port 18*a*. The conveyance member 18*b* includes a conveyance portion b1 (FIG. 10) which is in the shape of a helix in the axial direction of a rotational axis thereof, and is configured to rotate, thus conveying transfer residual toner, which has arrived at the inflow port 18*a*, in the direction of arrow Sc illustrated in FIG. 3. Details of a driving transmission method for rotating the conveyance member 18*b* are described below.

Figure 4:
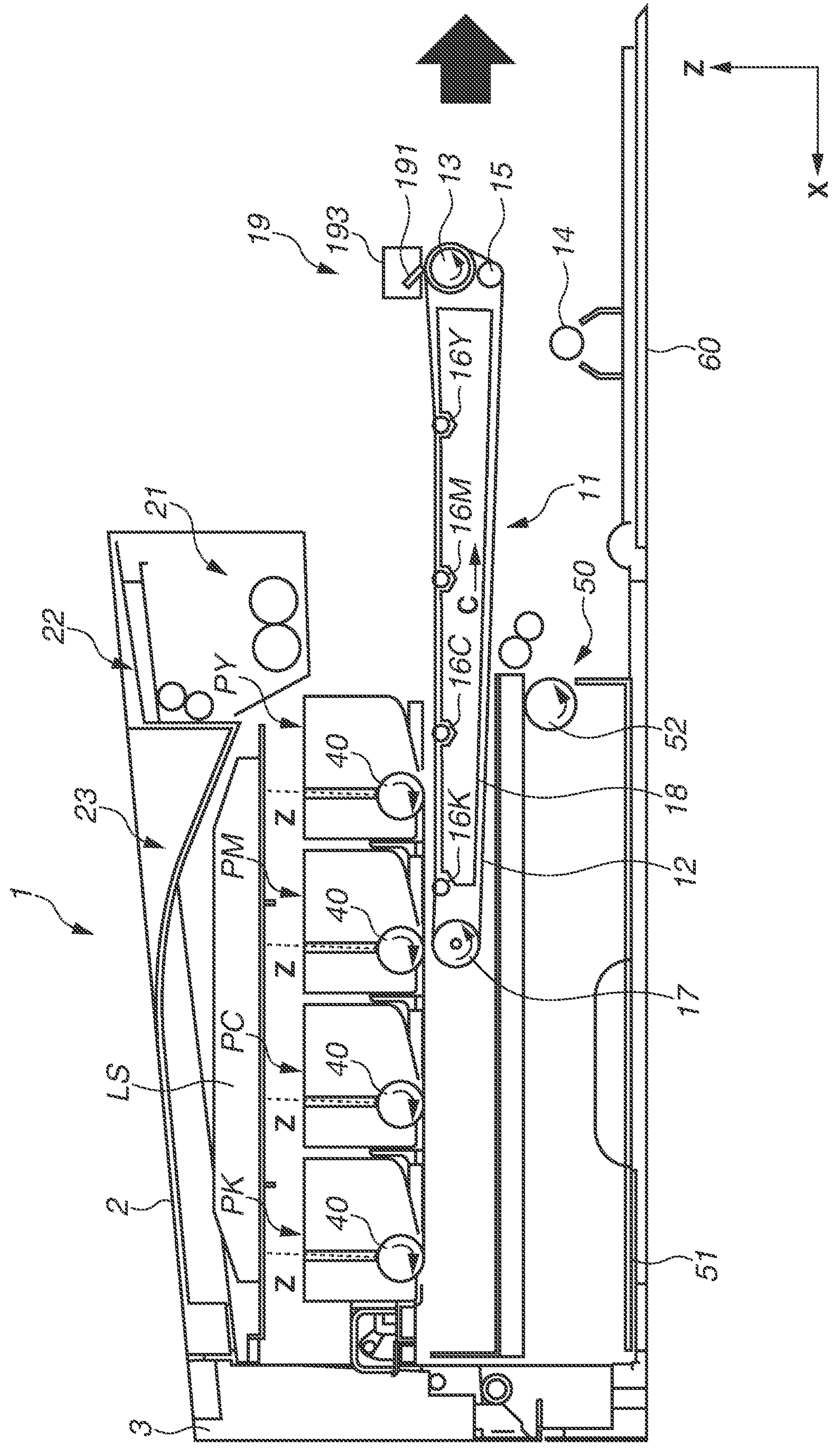
FIG. 4 is an outline sectional view used to explain attachment and detachment of the transfer unit in the first exemplary embodiment.

FIG. 4 is a schematic sectional view illustrating attachment and detachment of the transfer unit 11 in the first exemplary embodiment. As illustrated in FIG. 4, the transfer unit 11, which includes the recovery unit 19 and the storage container 18, is insertable from and extractable toward the back side of the apparatus body 2. At that time, when a rear door 60 of the apparatus body 2 is rotated with the lower portion thereof in the Z-axis direction at the back side of the apparatus body 2 serving as a fulcrum point and is thus opened toward the back side, an insertion and extraction operation for the transfer unit 11 becomes able to be performed, so that the transfer unit 11 is enabled to be attached to and detached from the apparatus body 2.

In a configuration in which the storage container 18 is provided inside the transfer unit 11 as in the first exemplary embodiment, at the time of replacing the transfer unit 11 due to, for example, component life, it is possible to also replace the storage container 18 in conjunction with the operation of replacing the transfer unit 11. This enables reducing a troublesome work for a replacement operation to be performed by the user or service engineer and thus improving usability. Additionally, according to the configuration of the first exemplary embodiment, providing the storage container 18 inside the transfer unit 11 enables reducing a space in which a storage container would have been conventionally located and thus attaining a reduction in size of the image forming apparatus 1. [Configurations of Transfer Unit and Storage Container]

Figure 5A:
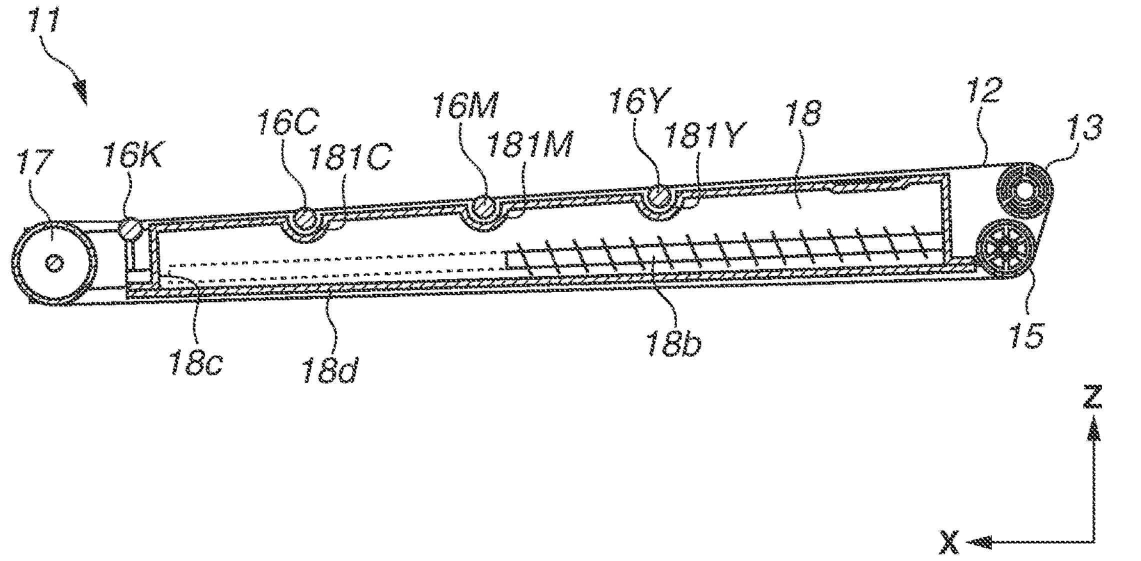
FIGS. 5A and 5B are schematic views illustrating configurations of the transfer unit and a storage container in the first exemplary embodiment.
Figure 5B:
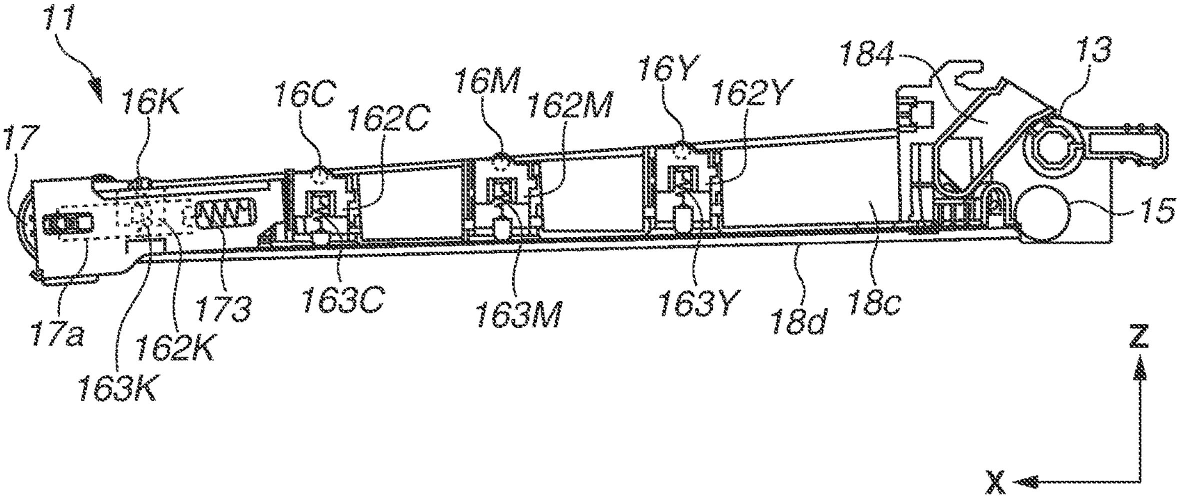

FIG. 5A is a schematic sectional view of the transfer unit 11 as viewed from the lateral side thereof (i.e., the XZ plane). Moreover, FIG. 5B is a schematic lateral view used to explain a configuration of the transfer unit 11 at the driving side thereof. Here, in FIG. 5B, the intermediate transfer belt 12 is omitted from illustration. As illustrated in FIGS. 5A and 5B, the storage container 18 in the first exemplary embodiment is provided inside a region configured by the inner circumferential surface of the intermediate transfer belt 12 in the transfer unit 11. Moreover, the bottom surfaces of the transfer unit 11 and the storage container 18 are located in such a way as to be approximately horizontal with respect to the bottom surface of the image forming apparatus 1.

The storage container 18 in the first exemplary embodiment includes, with respect to the direction of gravitational force, an upper-side member 18*c*, which constitutes the top surface of the storage container 18, and a lower-side member 18*d*, which constitutes the bottom surface of the storage container 18, and a housing is configured with the upper-side member 18*c* and the lower-side member 18*d*. More specifically, the upper-side member 18*c* is located at a side on which the primary transfer rollers 16 are arranged, and the lower-side member 18*d* is located at a position close to the bottom surface side of the image forming apparatus 1 in the transfer unit 11. Moreover, the upper-side member 18*c* and the lower-side member 18*d* constitute a housing of the storage container 18 by four sides of end portions of the upper-side member 18*c* and the lower-side member 18*d* configured approximately in a rectangular shape on the XY plane being joined together by ultrasonic welding. Furthermore, the method of fixing the upper-side member 18*c* and the lower-side member 18*d* is not limited to ultrasonic welding, but can be another type of welding such as thermal welding or another method such as fastening or adhesion as long as a configuration for preventing transfer residual toner from leaking from the storage container 18 is attained.

As illustrated in FIG. 5A, portions of the upper-side member 18*c* facing the primary transfer rollers 16Y, 16M, and 16C are configured to recede in a direction to move away from the positions at which the respective primary transfer rollers 16 are provided, in other words, in a direction to move toward the lower-side member 18*d*. More specifically, at positions of the upper-side member 18*c* at which the respective primary transfer rollers 16 are provided, groove portions 181Y, 181M, and 181C are formed along the extension directions of the respective primary transfer rollers 16 (in other words, the width direction of the intermediate transfer belt 12). This configuration enables, without restricting the rotations of the respective primary transfer rollers 16, sufficiently securing a toner storage capacity of the storage container 18. Moreover, forming the groove portions 181Y, 181M, and 181C on the upper-side member 18*c* enables increasing the strength of the storage container 18 and thus preventing or reducing deformation of the housing thereof.

As illustrated in FIG. 5B, the primary transfer rollers 16Y, 16M, 16C, and 16K are supported in a rotatable manner by primary transfer bearings 162Y, 162M, 162C, and 162K, respectively, at the end portion sides concerning the extension directions of the respective primary transfer rollers 16. The primary transfer bearings 162Y, 162M, 162C, and 162K are urged in the +Z-axis direction by respective springs 163Y, 163M, 163C, and 163K, each of which is fixed to the upper-side member 18*c* at one end side thereof, and are thus supported by the upper-side member 18*c* in the state of being able to move along the Z-axis direction.

In the configuration of the first exemplary embodiment, each primary transfer roller 16 does not have a mechanism which allows the primary transfer roller 16 to separate from the intermediate transfer belt 12. In other words, each primary transfer roller 16 being urged by each spring 163 (an urging member) forms a state in which the intermediate transfer belt 12 and each photosensitive drum 40 are always kept, or at least usually kept, in contact with each other. In this way, not providing a mechanism which allows each primary transfer roller 16 to separate from the intermediate transfer belt 12 in the transfer unit 11 enables allocating a region inside the transfer unit 11 to the capacity of the storage container 18 to the maximum extent.

Moreover, the tensile suspension roller 17, which is urged in the +X-axis direction by a tension spring 173 via a bearing 17*a*, suspends the intermediate transfer belt 12 in a tensioned manner Here, one end side of the tension spring 173 urges the bearing 17*a*, and the other end side thereof is supported by the upper-side member 18*c*. In the configuration of the first exemplary embodiment, moving the bearing 17*a* against the urging force of the tension spring 173 enables releasing the tensile-suspended state of the intermediate transfer belt 12 by the tensile suspension roller 17. [Driving Transmission Configuration of Conveyance Member]

Figure 6:
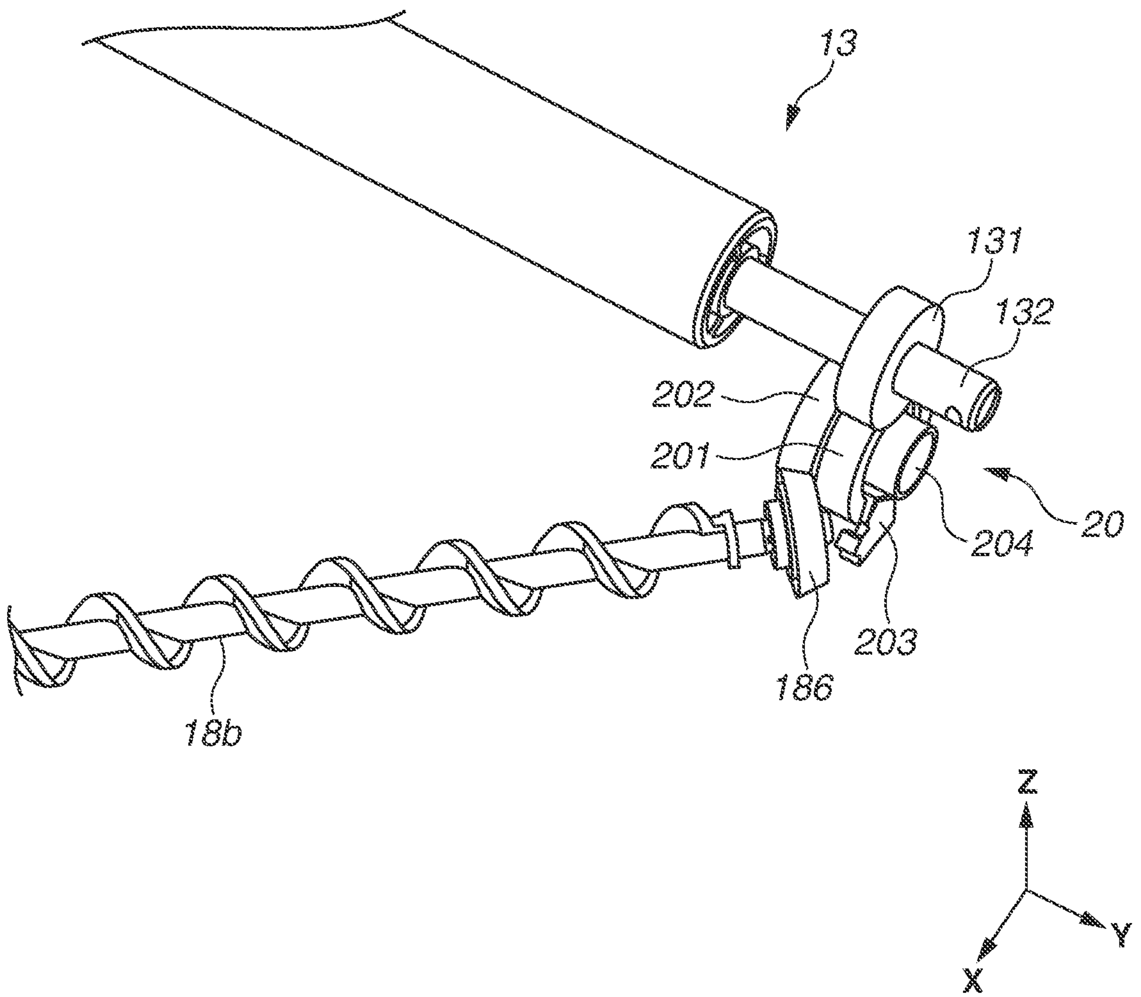
FIG. 6 is a schematic view used to explain transmission of driving to a conveyance member in the first exemplary embodiment.

FIG. 6 is a schematic view illustrating a mechanism which is provided at the driving side end portion of the transfer unit 11 and transmits driving to the driving roller 13 and the conveyance member 18*b*. As illustrated in FIG. 6, the conveyance member 18*b* and the driving roller 13 are coupled in terms of driving by a driving coupling member 20 provided in the transfer unit 11. The driving roller 13 includes, at the driving side end portion, a shaft portion 132, which rotates by receiving a driving force from the drive source M (not illustrated), and a gear 131, which rotates integrally with the shaft portion 132, and the conveyance member 18*b* includes a gear 186 at the driving side end portion. The driving coupling member 20 includes an axially movable gear 201, which engages with the gear 131, an axially fixed gear 202, which engages with the gear 186, a spring 204 (an urging member), which urges the axially movable gear 201 toward the axially fixed gear 202, a spring supporting portion 205 (illustrated in FIGS. 7A and 7B), and a detection lever 203. Although being described in detail below, the detection lever 203 is a movement member which is movable in association with the movement of the axially movable gear 201.

As the shaft portion 132 rotates upon receiving a driving force from the drive source M, the gear 131 also rotates. Then, the rotative force of the driving roller 13 is transmitted to the gear 186 by rotation of the gear 131 via the driving coupling member 20, so that the conveyance member 18*b* rotates. [Configuration of Driving Coupling Member]

Figure 7A:
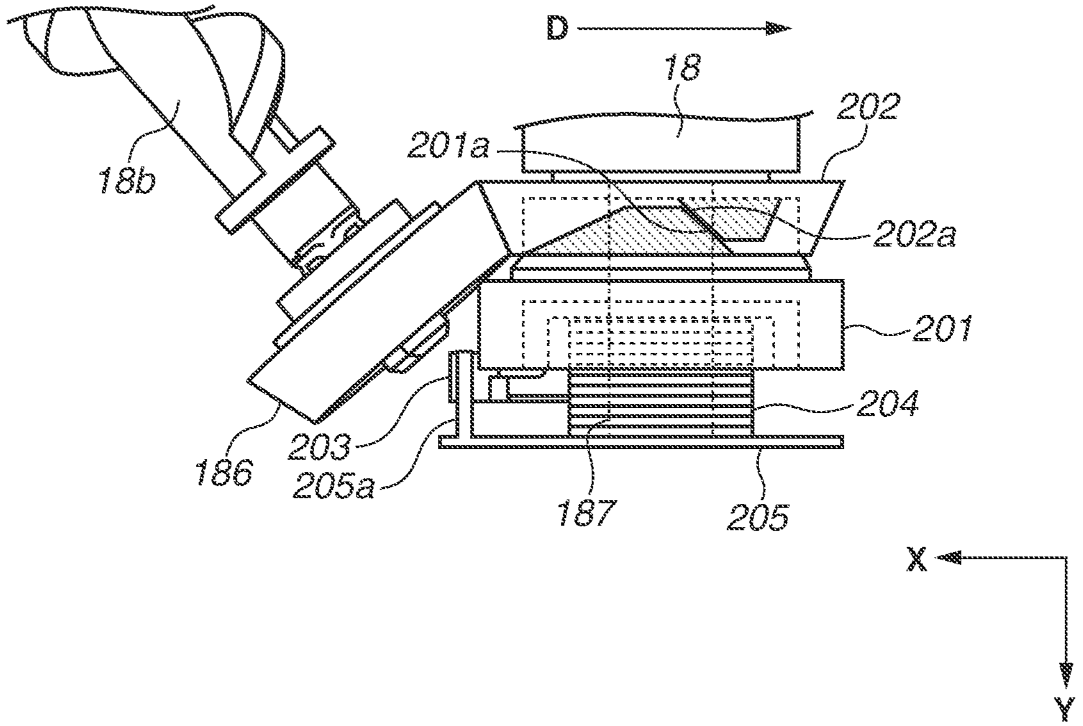
FIGS. 7A and 7B are schematic views illustrating a configuration of a drive coupling member in the first exemplary embodiment.
Figure 7B:
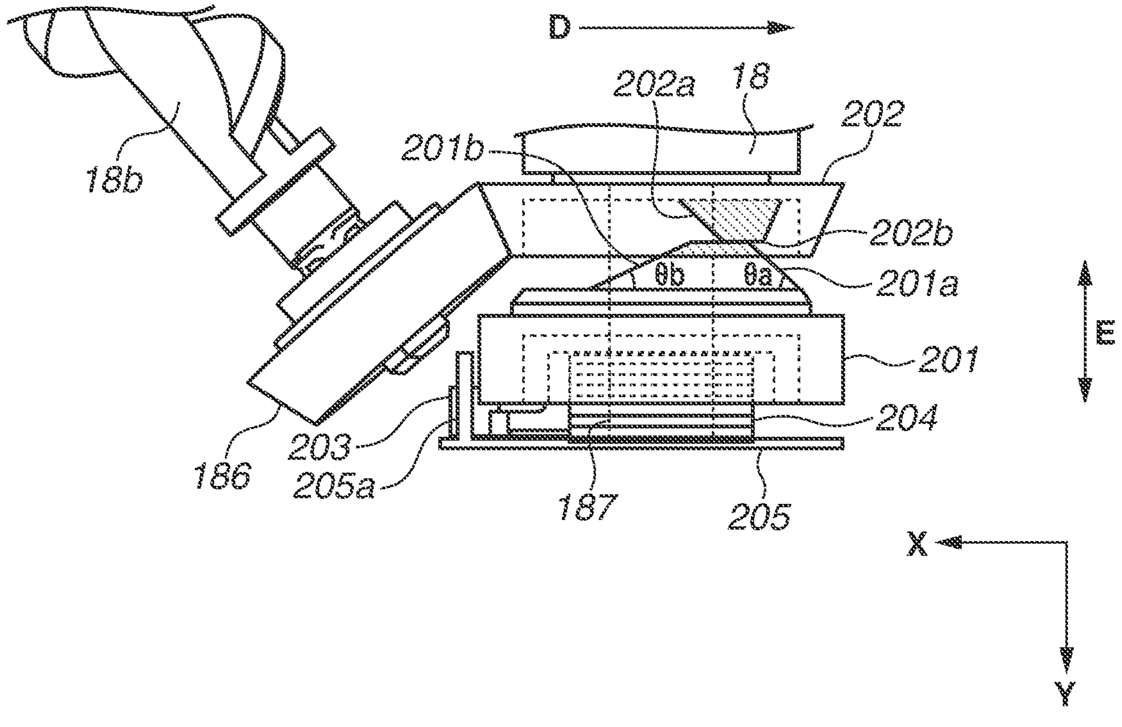

FIG. 7A is a schematic view illustrating a state in which the axially movable gear 201 and the axially fixed gear 202 engage with each other. Moreover, FIG. 7B is a schematic view illustrating a state in which, as a load serving as a force which the conveyance member 18*b* receives from transfer residual toner when rotating has become large, the axially movable gear 201 has moved against the urging force of the spring 204 and the engagement between the axially movable gear 201 and the axially fixed gear 202 has been released. In FIGS. 7A and 7B, the axially movable gear 201 is illustrated in a see-through form in such a manner that a configuration in which a ratchet surface 201*a* provided on the axially movable gear 201 and a ratchet surface 202*a* provided on the axially fixed gear 202 engage with or separate from each other can be viewed.

As illustrated in FIG. 7A, the axially fixed gear 202, the axially movable gear 201, the detection lever 203, and the spring 204 are fitted onto a ratchet shaft 187 provided in the storage container 18. Moreover, in the spring 204, one end side thereof is supported by the spring supporting portion 205, and the other end side thereof is in contact with the axially movable gear 201 and urges the axially movable gear 201 toward the axially fixed gear 202. The spring supporting portion 205 is provided with a rotation stopper 205*a* which restricts the rotation of the detection lever 203. The axially fixed gear 202 is provided with a slope-shaped ratchet surface 202*a*, and, when a slope-shaped ratchet surface 201*a* provided on the axially movable gear 201 and the ratchet surface 202*a* come into contact with each other, the axially fixed gear 202 and the axially movable gear 201 engage with each other. Here, while two slope-shaped ratchet surfaces are equally provided in each of the axially movable gear 201 and the axially fixed gear 202, the number of ratchet surfaces can be optionally set. Moreover, in FIGS. 7A and 7B, for ease of explanation of the configuration, a cross-section in which only one ratchet surface 201*a* and only one ratchet surface 202*a* are viewable is illustrated.

At the time of initial driving in which transfer residual toner is not yet conveyed to the storage container 18, a load Fr which the conveyance member 18*b* receives when rotating is smaller than a frictional force Fm caused between the ratchet surface 201*a* and the ratchet surface 202*a* by the urging force of the spring 204 (i.e., the frictional force Fm>the load Fr). Here, the load Fr is a force which the conveyance member 18*b* receives from transfer residual toner when rotating. Therefore, the ratchet surface 201*a* and the ratchet surface 202*a* do not slide relative to each other and rotate around the ratchet shaft 187 in the direction of arrow D illustrated in FIG. 7A while keeping a contact state illustrated in FIG. 7A, thus transmitting a rotational force transmitted from the gear 131 to the gear 186. With this, a driving force from the drive source M is transmitted to the conveyance member 18*b* via the gear 131, the driving coupling member 20, and the gear 186.

Then, in association with an image forming operation being performed in the image forming apparatus 1, transfer residual toner, which has remained on the intermediate transfer belt 12, is recovered by the recovery unit 19 and is then conveyed by the conveyance member 18*b* to the inside of the storage container 18. When, as the number of times an image forming operation is performed increases, transfer residual toner accumulating inside the storage container 18 increases, a load Fr which the conveyance member 18*b* conveying transfer residual toner receives when rotating rises. If the rising of the load Fr reaches a predetermined level or more, the load Fr becomes larger than the frictional force Fm (the load Fr>the frictional force Fm).

Here, an end portion of the axially fixed gear 202 opposite to the end portion thereof at the side contacting the axially movable gear 201 is in abutting contact with the wall surface of the storage container 18, and the axially movable gear 201 is urged by the spring 204 toward the axially fixed gear 202. In other words, the axially movable gear 201 is located in the state of having a degree of freedom of being able to move in a direction opposite to the urging direction of the spring 204. Accordingly, in this state, when the load Fr exceeds the frictional force Fm, the ratchet surface 201*a* relatively slides with respect to the ratchet surface 202*a*, so that the axially movable gear 201 moves in the +Y-axis direction along the ratchet shaft 187 while rotating.

Then, as the axially movable gear 201 continues rotating in the state in which the load Fr exceeds the frictional force Fm, as illustrated in FIG. 7B, the ratchet surface 201*a* and the ratchet surface 202*a* separate from each other. When, upon receiving a rotational force from the gear 131, the axially movable gear 201 further rotates from the state illustrated in FIG. 7B in the direction of arrow D illustrated in FIG. 7B, the axially movable gear 201 returns to a state illustrated in FIG. 7A while a ratchet surface 201*b* provided on the axially movable gear 201 is kept in contact with a ratchet abutting-contact portion 202*b*. Here, the ratchet surface 201*b* is a slant surface provided at a position different from that of the ratchet surface 201*a*. In an operation of returning from the state illustrated in FIG. 7B to the state illustrated in FIG. 7A, the axially movable gear 201 is urged by the spring 204, so that the axially movable gear 201 slides toward the axially fixed gear 202 along the shape of the slant surface of the ratchet surface 201*b*.

In this way, in the driving coupling member 20 in the first exemplary embodiment, when the load Fr is smaller than the frictional force Fm, as illustrated in FIG. 7A, the axially movable gear 201 and the axially fixed gear 202 rotate in the direction of arrow D illustrated in FIG. 7A while engaging with each other. On the other hand, when the load Fr rises and exceeds the frictional force Fm, the axially movable gear 201 rotates while moving against the urging force of the spring 204 and then transitions from the state illustrated in FIG. 7A to the state illustrated in FIG. 7B, and, after that, the axially movable gear 201 repeats an operation of returning to the state illustrated in FIG. 7A again. With this configuration, in the state in which the load Fr, which the conveyance member 18*b* receives when rotating, exceeds the frictional force Fm, the axially movable gear 201 repeats a movement operation in directions indicated by a double arrow E illustrated in FIG. 7B. At this time, in conjunction with the movement operation of the axially movable gear 201, the detection lever 203 also repeats a movement operation in the directions of double arrow E illustrated in FIG. 7B.

Furthermore, it is possible to set the frictional force Fm to a desired range by appropriately setting, for example, an angle θa made by each of the ratchet surface 201*a* and the ratchet surface 202*a* with respect to the X-axis direction, materials used to configure the ratchet surface 201*a* and the ratchet surface 202*a*, and the urging force of the spring 204. In this way, appropriately setting the frictional force Fm enables appropriately setting a load which causes a movement operation of the axially movable gear 201 in the directions of double arrow E illustrated in FIG. 7B to be performed.

Moreover, when transitioning from the state illustrated in FIG. 7B to the state illustrated in FIG. 7A, the axially movable gear 201 moves along the slant surface of the ratchet surface 201*b* while receiving the urging force of the spring 204, so that the axially movable gear 201 and the axially fixed gear 202 engage with each other. Therefore, when, after completion of downward sliding on the slant surface of the ratchet surface 201*b*, the axially movable gear 201 and the axially fixed gear 202 come into contact with each other, a contact noise may be generated. To reduce the contact noise, it is more desirable to set an angle θb of the slant surface of the ratchet surface 201*b* with respect to the X-axis direction to a small value.

Figure 8:
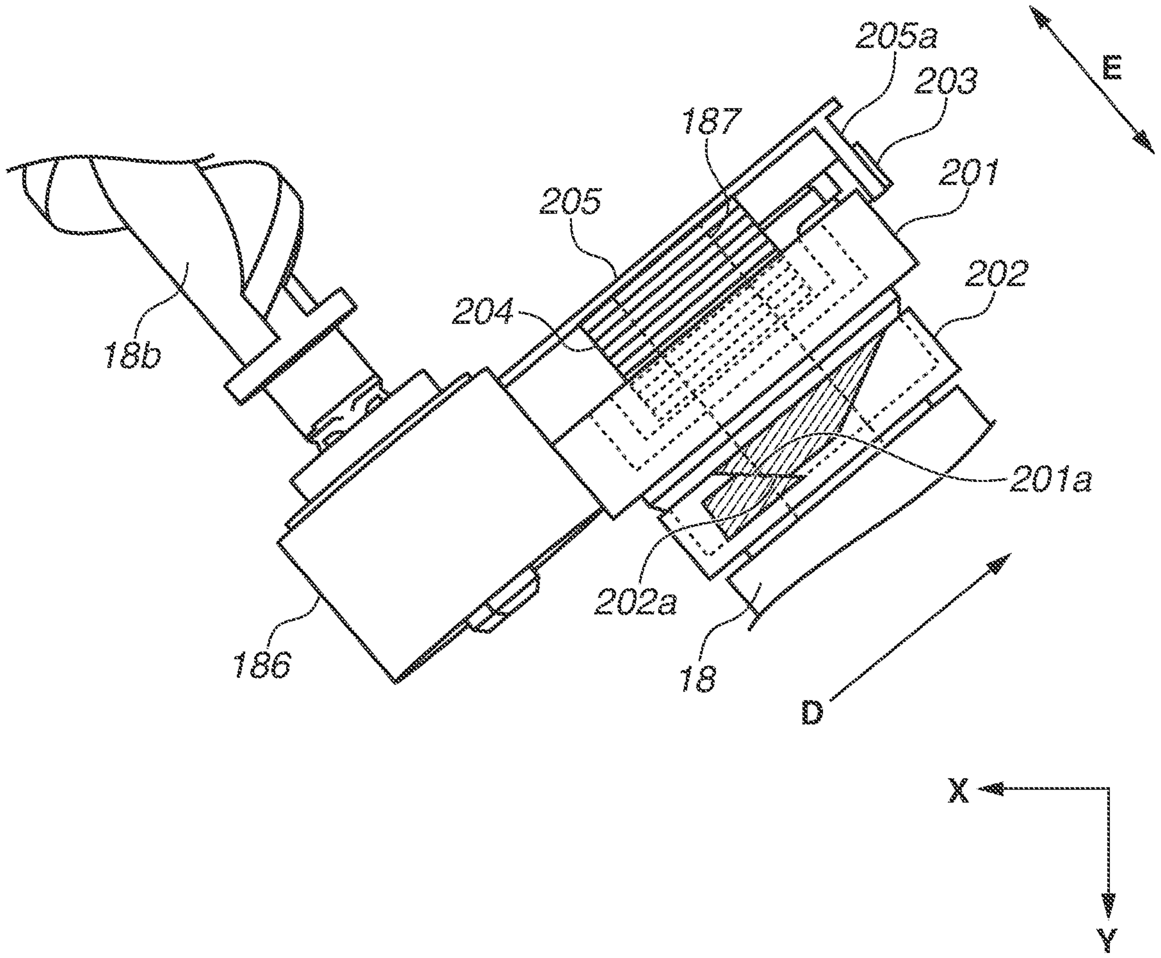
FIG. 8 is a schematic view illustrating a modification example of the drive coupling member in the first exemplary embodiment.

FIG. 8 is a schematic view illustrating a configuration of a modification example of the driving coupling member 20 in the first exemplary embodiment. As illustrated in FIG. 8, in the present modification example, positions of the axially movable gear 201 and the axially fixed gear 202 are interchanged with respect to the configuration illustrated in FIGS. 7A and 7B. More specifically, in the present modification example, driving is input from the gear 131 to the axially fixed gear 202, and the axially movable gear 201 engages with the axially fixed gear 202 at the ratchet surfaces 201*a* and 202*a*. Then, driving is transmitted from the axially movable gear 201 to the gear 186, so that toner is conveyed by the rotation of the conveyance member 18*b*.

[Detection of Full-storage State of Storage Container]

Figure 9A:
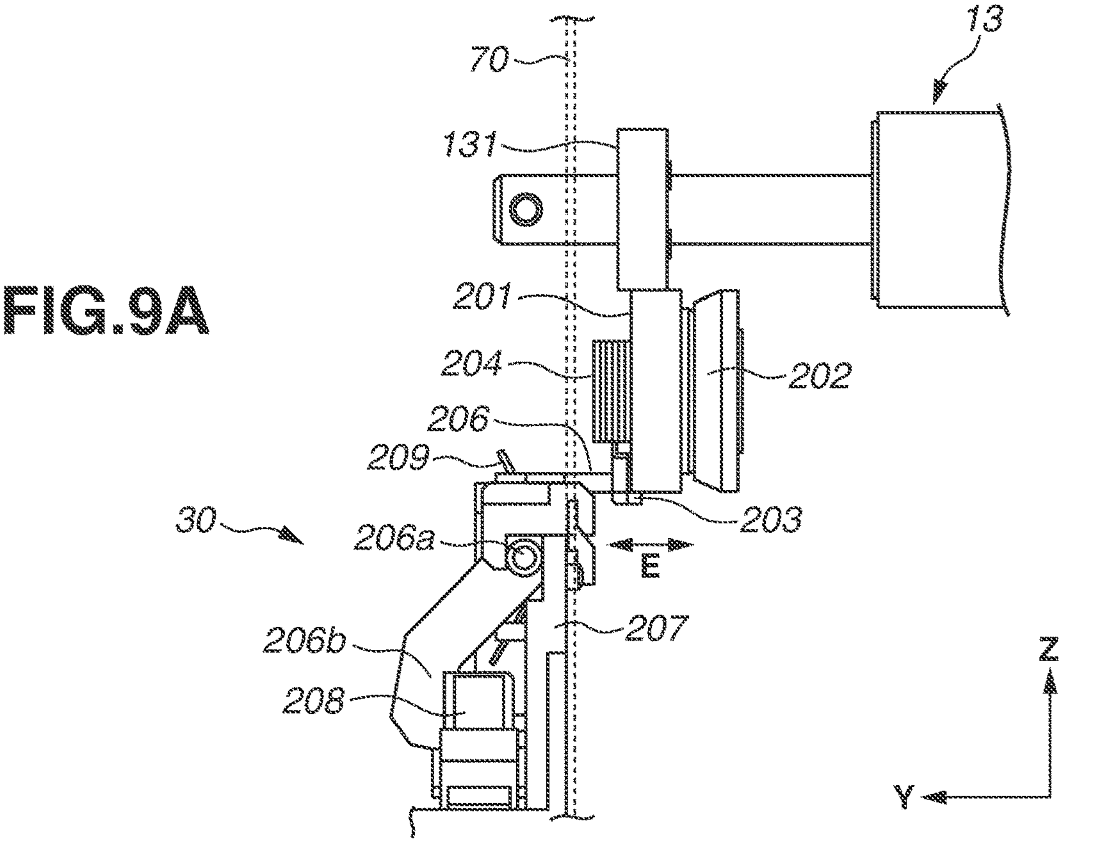
FIGS. 9A and 9B are schematic views used to explain a full-storage detection method for the storage container in the first exemplary embodiment.
Figure 9B:
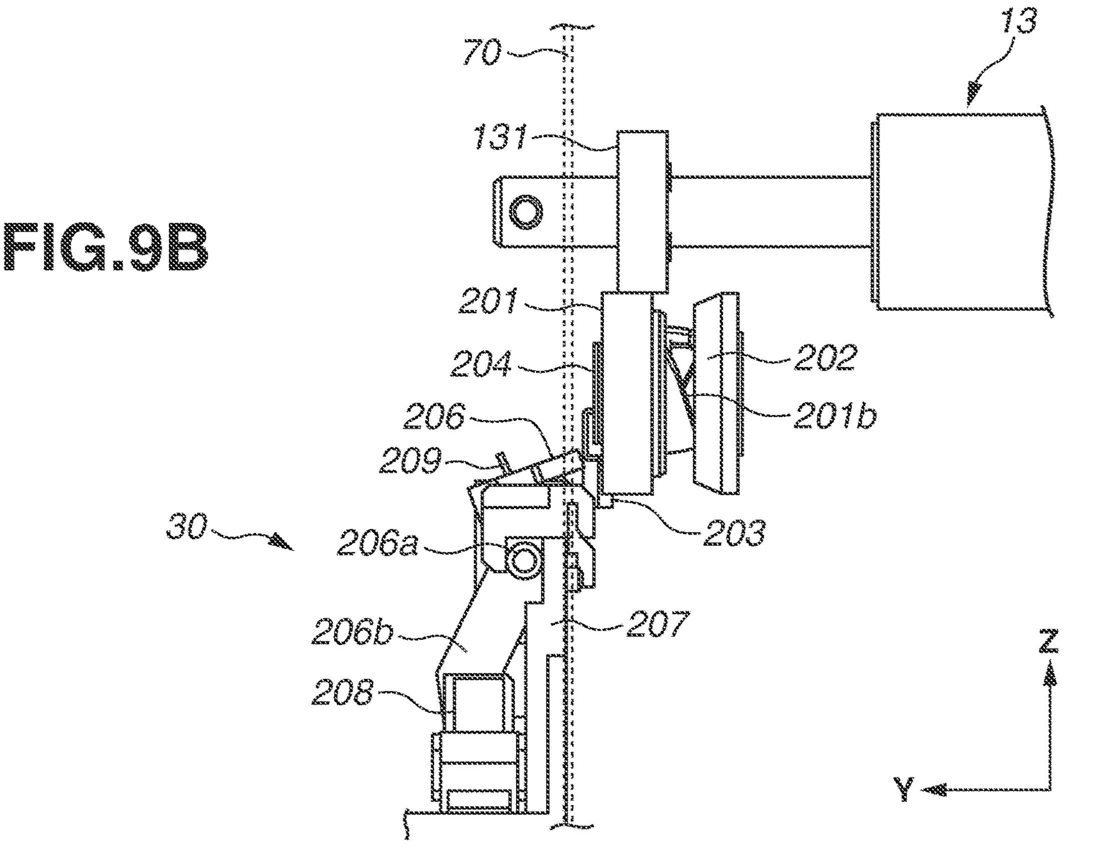

Next, in the first exemplary embodiment, a method of detecting that the storage container 18 has come into a full-storage state due to transfer residual toner is described. FIG. 9A is a schematic view used to explain a peripheral configuration of the driving coupling member 20 in the state in which the ratchet surface 201*a* of the axially movable gear 201 and the ratchet surface 202*a* of the axially fixed gear 202 are engaged with each other. Moreover, FIG. 9B is a schematic view used to explain the peripheral configuration of the driving coupling member 20 in the state in which the ratchet surface 201*a* of the axially movable gear 201 and the ratchet surface 202*a* of the axially fixed gear 202 are separated from each other. The configuration in the first exemplary embodiment is able to detect a full-storage state of the storage container 18 by a detection flag 206 and a detection sensor 208 provided in the apparatus body 2 of the image forming apparatus 1 detecting a movement operation of the detection lever 203 associated with the above-mentioned movement of the axially movable gear 201.

As illustrated in FIGS. 9A and 9B, a detection unit 30, which includes the detection flag 206, a detection holder 207, a detection spring 209, and the detection sensor 208, is provided opposite to the transfer unit 11 across a body side plate 70, which configures a housing of the image forming apparatus 1, with respect to the Y-axis direction. The detection holder 207 is attached on the body side plate 70. Moreover, the detection flag 206 has one end side thereof which is in abutting contact with the detection lever 203 provided in the transfer unit 11 and the other end side which is provided with a detection portion 206*b*, and is able to rotate around a rotation fulcrum 206*a*. In response to the detection flag 206 rotating around the rotation fulcrum 206*a* and the position of the detection portion 206*b* being changed, the ON-state or OFF-state of the detection sensor 208 is switched.

As illustrated in FIG. 9A, in the state in which the load Fr, which the conveyance member 18*b* conveying transfer residual toner receives when rotating, is smaller than the frictional force Fm, the axially movable gear 201 and the axially fixed gear 202 rotate while engaging with each other. At this time, the axially movable gear 201, which is urged by the spring 204, and the detection lever 203 are situated at a first position. Moreover, the detection portion 206*b* of the detection flag 206 is situated at such a position as not to be detected by the detection sensor 208, so that the detection sensor 208 is in an OFF-state. Starting with that state, as transfer residual toner progressively accumulates inside the storage container 18, the load Fr, which the conveyance member 18*b* receives when rotating, progressively rises. Then, when the load Fr has become larger than the frictional force Fm, as mentioned above, the axially movable gear 201 and the detection lever 203 move to a second position against the urging force of the spring 204, and thus come into a state illustrated in FIG. 9B.

As illustrated in FIG. 9B, when the axially movable gear 201 and the detection lever 203 move from the first position to the second position, the detection flag 206 is pushed by the detection lever 203 and thus rotates around the rotation fulcrum 206*a* against the urging force of the detection spring 209. As the detection flag 206 rotates, the detection portion 206*b* moves to a position which is detected by the detection sensor 208, so that the detection sensor 208 comes into an ON-state.

As already described with reference to FIGS. 7A and 7B, in the state in which the load Fr is larger than the frictional force Fm, the axially movable gear 201 and the detection lever 203 perform a movement operation in directions indicated by a double arrow E illustrated in FIG. 9A. With this movement operation performed, the state illustrated in FIG. 9A and the state illustrated in FIG. 9B are alternately repeated, so that the detection sensor 208 detects the ON-state and the OFF-state being performed a predetermined number of times or more during a predetermined time according to the rotation speed of the axially movable gear 201. In a case where the detection sensor 208 has detected the ON-state and the OFF-state being performed the predetermined number of times or more during the predetermined time, the first exemplary embodiment determines that the load Fr, which the conveyance member 18*b* receives from transfer residual toner when rotating, has become larger than the frictional force Fm and, thus, the storage container 18 is in a full-storage state. Here, in the first exemplary embodiment, the predetermined time and the predetermined number of times which are used to detect the ON-state and the OFF-state at the time of detecting a full-storage state of the storage container 18 by the detection sensor 208 are assumed to be previously set in a control unit (not illustrated).

Here, as illustrated in FIG. 9B, in the state in which the axially movable gear 201 and the detection lever 203 have moved to the second position, it is desirable that the protrusion amount of the detection lever 203 in the Y-axis direction do not extend beyond the body side plate 70. With this configuration employed, even if the transfer unit 11 is extracted from the apparatus body 2 in the state in which the axially movable gear 201 and the detection lever 203 are situated at the second position as illustrated in FIG. 9B, the transfer unit 11 is prevented from becoming stuck with the body side plate 70, so that the attachment and detachment facility of the transfer unit 11 can be improved.

Moreover, as illustrated in FIGS. 7A and 7B, the spring supporting portion 205 is provided with the rotation stopper 205*a*, which restricts the rotation of the detection lever 203, so that the detection lever 203 slides with respect to the axially movable gear 201 but does not rotate. Therefore, as illustrated in FIGS. 9A and 9B, the detection lever 203 and the detection flag 206 do not rotate even in the state in which the axially movable gear 201 is being driven to rotate, and are high in positional accuracy because of components thereof not wearing by rotation. This enables detecting a full-storage state of the storage container 18 with a high degree of accuracy.

[Filling Storage Container with Transfer Residual Toner]

Figure 10:
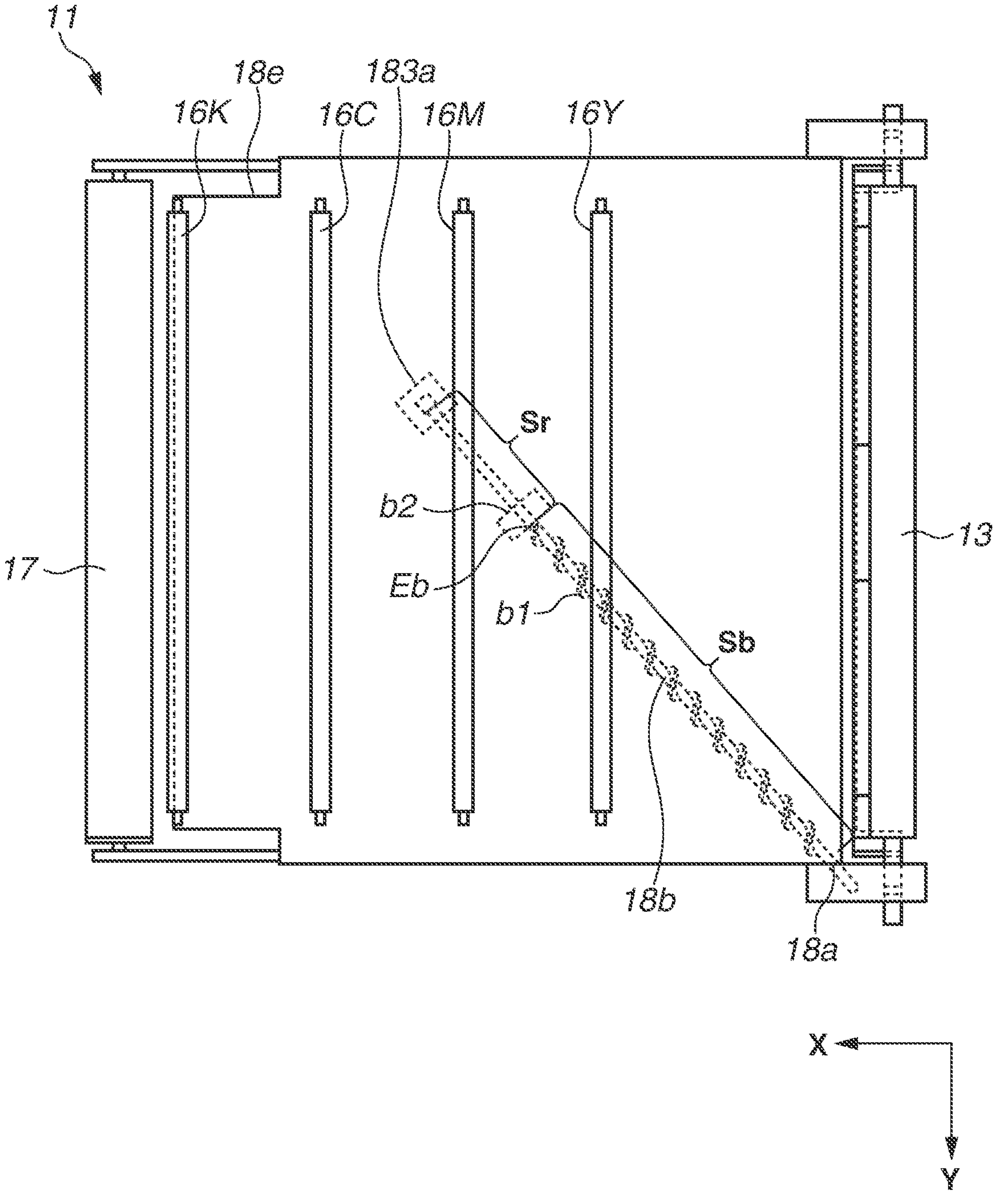
FIG. 10 is a schematic view illustrating configurations of the transfer unit and the storage container in the first exemplary embodiment.

FIG. 10 is an outline schematic view of the transfer unit 11 and the storage container 18 as viewed while being projected on the horizontal plane (i.e., the XY plane) from a direction perpendicular to the movement direction of the intermediate transfer belt 12 and the extension direction of each primary transfer roller 16. In FIG. 10, for ease of explanation of the configuration of the storage container 18, the intermediate transfer belt 12 in the transfer unit 11 is omitted from illustration. Transfer residual toner which flows in the storage container 18 from the inflow port 18*a* via the conveyance path 184 is conveyed by the conveyance member 18*b* to a central area Ac (an approximately central portion) (FIG. 11B) of the storage container 18 in the XY plane. The central area Ac is described in detail below.

As illustrated in FIG. 10, with respect to the rotational axis direction of the conveyance member 18*b*, the conveyance member 18*b* has one end portion provided at the side of the inflow port 18*a* and the other end portion supported by a bearing 183*a* (a supporting portion). The bearing 183*a* is provided at the lower-side member 18*d* of the storage container 18 and supports the conveyance member 18*b* in a rotatable manner. The conveyance member 18*b* includes, with respect to the rotational axis direction thereof, a region Sb, in which a conveyance portion b1 is provided, and a region Sr, in which no conveyance portion b1 is provided and which is configured with only an axial portion. At the boundary between the region Sb and the region Sr, with respect to the rotational axis direction, an end portion Eb (a terminal portion) of the conveyance portion b1, which is provided at a side opposite to the side of the inflow port 18*a*, is provided. Here, as also illustrated in FIG. 10, the rotational axis direction of the conveyance member 18*b* is a direction which is perpendicular to neither the X-axis direction, which is the movement direction of the intermediate transfer belt 12, nor the Y-axis direction, which is the extension direction of each primary transfer roller 16 and which intersects with the X-axis direction and the Y-axis direction.

When the storage container 18 is viewed while being projected on the XY plane, the end portion Eb is provided at the downstream side of the primary transfer roller 16Y and at the upstream side of the primary transfer roller 16K with respect to the X-axis direction, which is the movement direction of the intermediate transfer belt 12. In other words, the end portion Eb is provided at a position between the primary transfer roller 16Y and the primary transfer roller 16K with respect to the X-axis direction. With regard to the more detailed position in the first exemplary embodiment, the end portion Eb is provided at a central area Ac (illustrated in FIG. 11B) of the storage container 18, which is a position between the primary transfer roller 16Y and the primary transfer roller 16M. With this configuration, transfer residual toner which has flowed in from the inflow port 18*a* is conveyed by the conveyance portion b1 from the inflow port 18*a* toward the end portion Eb inside the storage container 18 and then accumulates at the central area Ac of the storage container 18, which is a terminal portion of the region Sb.

Here, with respect to the rotational axis direction of the conveyance member 18*b*, if the bearing 183*a* is provided in the vicinity of the end portion Eb to support the other end portion of the conveyance member 18*b*, rotational sliding between the bearing 183*a* and the conveyance member 18*b* would occur in the vicinity of a region which strongly receives a toner conveyance force from the conveyance member 18*b*. In a case where such a configuration, i.e., a configuration in which no region Sr is provided, is employed, toner being firmly fixed at a position where rotational sliding occurs may cause a decrease in the conveyance stability of transfer residual toner by the conveyance member 18*b*.

Moreover, although details are described below, according to the configuration of the first exemplary embodiment, the storage container 18 is progressively filled with transfer residual toner which has been conveyed by the conveyance member 18*b* while spreading in a concentric fashion at the end portion Eb. However, if the bearing 183*a* is undesirably provided in the vicinity of the end portion Eb, a concentric unevenness may occur when transfer residual toner spreads. Therefore, it is desirable that, as illustrated in FIG. 10, the region Sr, which does not have the helical conveyance portion b1, be provided between the region Sb and the bearing 183*a*. However, the length of the region Sr in the rotational axis direction thereof is a length to be optionally set, and the first exemplary embodiment is not limited to a configuration in which, as illustrated in FIG. 10, the terminal end of the conveyance member 18*b* is provided near the primary transfer roller 16M as viewed on the XY plane of the storage container 18. For example, a configuration in which the region Sr is provided longer than that illustrated in FIG. 10 and the terminal end of the conveyance member 18*b* is provided in the vicinity of a wall surface 18*e* at which a virtual line concerning the rotational axis direction of the conveyance member 18*b* and the housing of the storage container 18 intersect with each other on the XY plane can be employed. Moreover, although details are described below, a force receiving portion b2 is provided at the terminal portion of the region Sb of the conveyance member 18*b*.

Figure 11A:
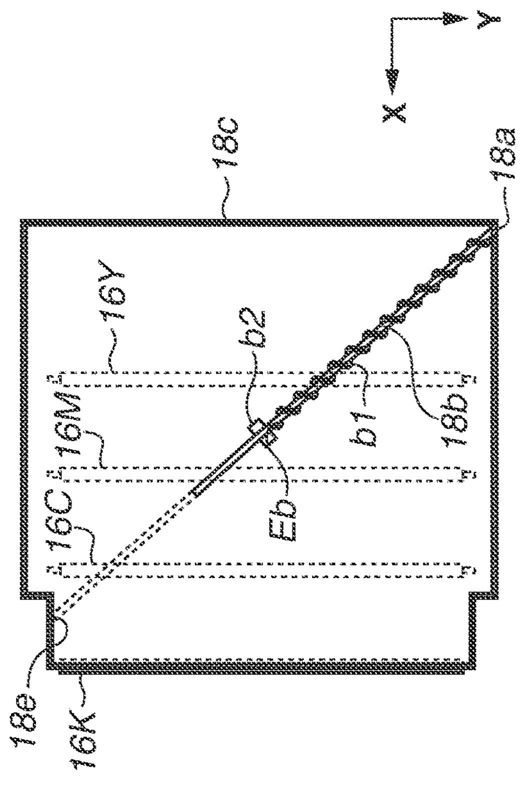
FIGS. 11A, 11B, 11C, and 11D are schematic views used to explain filling of the storage container with transfer residual toner in the first exemplary embodiment.
Figure 11B:
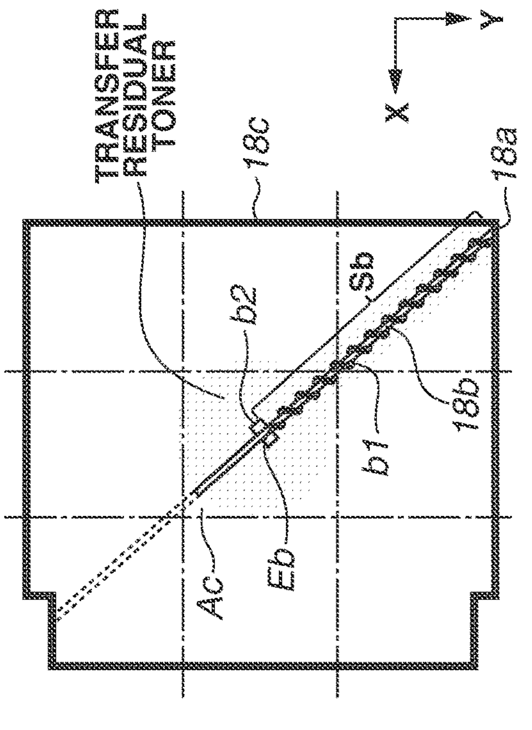
Figure 11C:
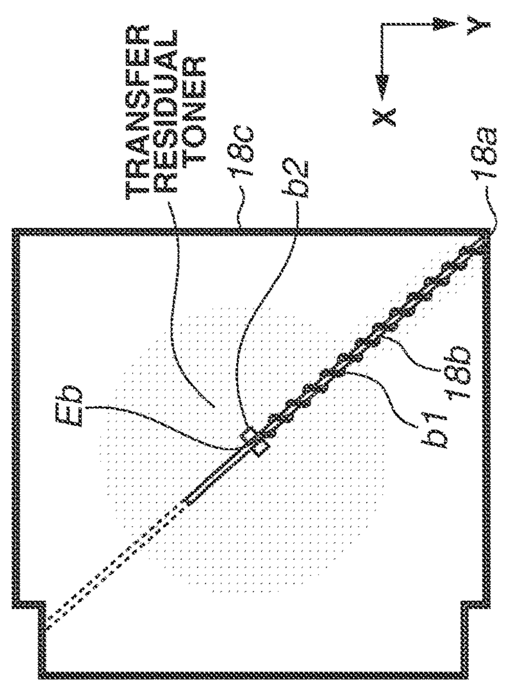
Figure 11D:
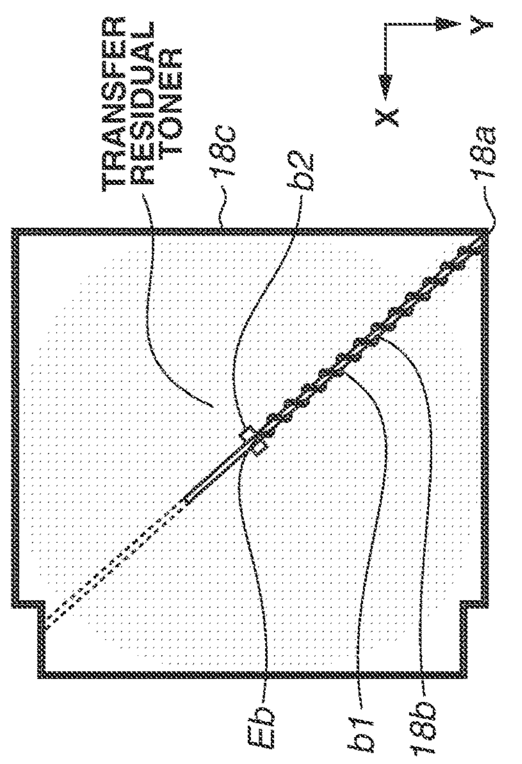

Next, filling of the storage container 18 with transfer residual toner in the first exemplary embodiment is described with reference to FIGS. 11A, 11B, 11C, and 11D. FIG. 11A is a schematic view, as viewed while being projected on the XY plane, illustrating the storage container 18 in the state obtained before transfer residual toner arrives at the inflow port 18*a* of the storage container 18. FIGS. 11B, 11C, and 11D are schematic views illustrating respective behaviors in which the storage container 18 is progressively filled with transfer residual toner which is conveyed from the inflow port 18*a* toward the end portion Eb by the rotation of the conveyance member 18*b*.

In the configuration of the first exemplary embodiment, filling with transfer residual toner is started with a state in which transfer residual toner is not yet stored in the storage container 18 as illustrated in FIG. 11A. When transfer residual toner arrives at the inflow port 18*a*, transfer residual toner is conveyed toward the end portion Eb by the rotation of the conveyance member 18*b*, so that the state illustrated in FIG. 11B appears. Then, as illustrated in FIG. 11B, transfer residual toner which has been conveyed toward the end portion Eb, which is provided at the central area Ac of the storage container 18, by the conveyance member 18*b* accumulates around the end portion Eb and spreads in a concentric fashion, thus filling the inside of the storage container 18. Here, in the first exemplary embodiment, the end portion Eb is located near the middle point of a straight line segment connecting the position at which a virtual line concerning the rotational axis direction of the conveyance member 18*b* and the wall surface 18*e* of the storage container 18 intersect with each other and the position of the inflow port 18*a*.

Here, dashed-dotted lines illustrated in FIG. 11B are lines which divide the storage container 18 into three equal parts with respect to each of the X-axis direction, which is the movement direction of the intermediate transfer belt 12, and the Y-axis direction, which is the width direction of the intermediate transfer belt 12. Performing segmentation in this way enables dividing the storage container 18 into approximately equal nine areas on the XY plane as illustrated in FIG. 11B. In the first exemplary embodiment, the end portion Eb of the conveyance member 18*b* is located inside the central area Ac out of the nine areas into which the storage container 18 is equally divided. The central area Ac as used herein is an area at which a middle area obtained as a result of equally dividing the storage container 18 into three areas with respect to the X-axis direction and a middle area obtained as a result of equally dividing the storage container 18 into three areas with respect to the Y-axis direction overlap each other.

As illustrated in FIG. 11C, transfer residual toner continues being conveyed toward the end portion Eb by the rotation of the conveyance member 18*b* and a concentric shape of transfer residual toner expands, so that filling with transfer residual toner is continued. Then, when filling with transfer residual toner is further performed from the state illustrated in FIG. 11C, as illustrated in FIG. 11D, transfer residual toner which has spread in a concentric fashion arrives at each of four wall surfaces of the upper-side member 18*c*, which is approximately rectangular-shaped, so that the inside of the storage container 18 is fully filled with transfer residual toner. Furthermore, in the configuration of the first exemplary embodiment, the bottom surface of the storage container 18 is configured to be approximately horizontal with respect to the bottom surface of the image forming apparatus 1, in other words, the lower-side member 18*d* has a shape approximately horizontal with respect to the mounting surface of the image forming apparatus 1. According to this configuration, transfer residual toner which spreads in a concentric fashion in the storage container 18 arrives at the respective four wall surfaces of the storage container 18 almost at the same time, so that such a configuration is favorable in terms of a filling efficiency.

As described above, the first exemplary embodiment has a configuration in which a single conveyance member 18*b* is provided inside the storage container 18 and the inside of the storage container 18 is filled with transfer residual toner which is conveyed by the conveyance member 18*b* in a concentric fashion. According to this configuration, since filling with transfer residual toner is able to be efficiently performed by using only a single conveyance member 18*b*, it is not necessary to provide a plurality of conveyance members inside the storage container 18, so that the filling rate of toner with respect to the capacity of a storage container can be improved. Moreover, since it is not necessary to provide a plurality of conveyance members, a reduction in cost of the image forming apparatus can also be attained.

Additionally, in a conventional configuration in which a plurality of conveyance members is provided inside a storage container, coupling of rotary operations between the plurality of conveyance members is required in an internal space of the storage container in which transfer residual toner is stored. In this case, it is necessary to employ a configuration which is able to cope with, for example, a faulty operation caused by abnormal noise or vibration occurring when transfer residual toner has adhered to a coupling portion for rotary operations or a component breakage caused by toner fusion associated with frictional heat generated at the coupling portion for rotary operations. However, according to the configuration of the first exemplary embodiment, since it is not necessary to employ a configuration which performs driving coupling between a plurality of members in a storage container, it is not necessary to take the above-mentioned matter into account. As a result, the first exemplary embodiment is able to more stably perform filling of the storage container 18 with transfer residual toner with use of a more simplified configuration.

[Configuration and Action of Force Receiving Portion]

As illustrated in FIG. 10 and FIGS. 11A to 11D, in the first exemplary embodiment, to detect a full-storage state of the storage container 18 with a high degree of accuracy, the force receiving portion b2 is provided at the terminal portion of the region Sb of the conveyance member 18*b*. Here, the force receiving portion b2 is provided in such a manner that a rotational load acting on the conveyance portion b1 of the conveyance member 18*b* becomes high, and the shape of the force receiving portion b2 is described below.

Figure 12:
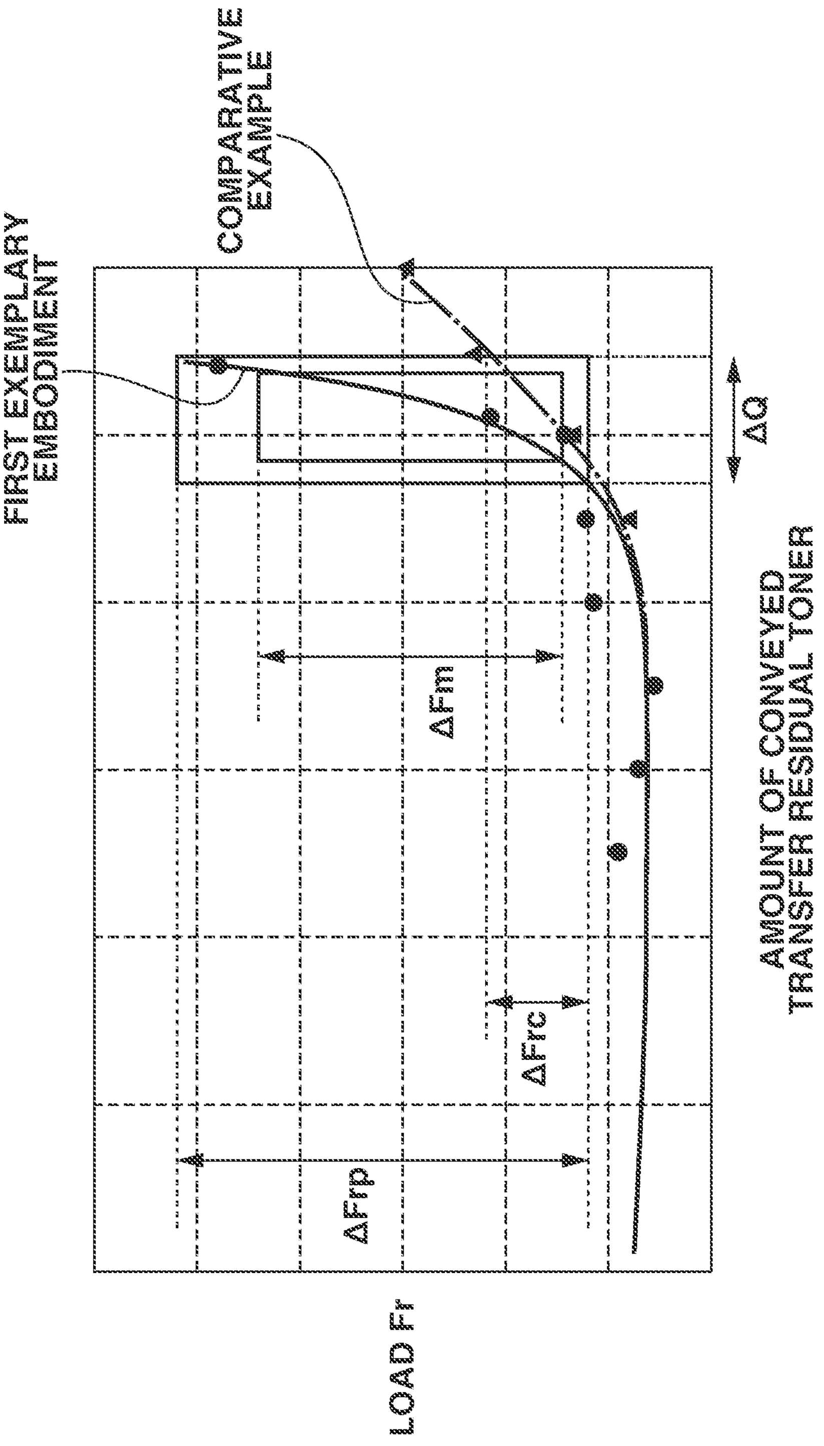
FIG. 12 is a schematic graph illustrating a relationship between the amount of transfer residual toner conveyed to the storage container by the conveyance member and a load which the conveyance member receives when rotating.

FIG. 12 is a schematic graph illustrating a relationship between the amount of transfer residual toner conveyed to the storage container 18 by the conveyance member 18*b* (on the horizontal axis) and the load Fr which the conveyance member 18*b* receives when rotating (on the vertical axis), at the time of filling with transfer residual toner in the first exemplary embodiment and a comparative example. Here, the comparative example corresponds to the configuration of a transfer unit in which no force receiving portion is provided at the terminal portion of the conveyance member, which is substantially the same as the configuration of the first exemplary embodiment except that the conveyance member has no force receiving portion.

Here, a range of amounts of transfer residual toner conveyed by the conveyance member 18*b* at the timing at which to issue a notification of a full-storage state of the storage container 18 such as that illustrated in FIG. 11D is referred to as a "full-storage detection range ΔQ", which is illustrated in FIG. 12. In the configuration of the comparative example, as illustrated in FIG. 12, although the load Fr rises in association with filling of the storage container with transfer residual toner, such rising is gradual, so that, even if the amount of conveyed transfer residual toner increases and reaches the full-storage detection range ΔQ, the rise of the load Fr is small. Then, in the full-storage detection range ΔQ in the comparative example, a load range ΔFrc, which is determined in consideration of a variation of the load Fr, does not exceed a frictional force range ΔFm, which is a range of variation of the frictional force Fm and is set in consideration of variations in component dimension and friction coefficient. As a result, there may occur a case in which, regardless of the full-storage detection range ΔQ being reached, the detection unit 30 is not able to correctly, or at least appropriately, detect a full-storage state of the storage container 18.

On the other hand, in the configuration of the first exemplary embodiment, which has the force receiving portion b2, transfer residual toner which has been conveyed by the conveyance portion b1 arrives at the force receiving portion b2. In the state in which the amount of transfer residual toner is small as illustrated in FIG. 11B, even if the conveyed transfer residual toner has arrived at the force receiving portion b2, since the filling density of toner is low, transfer residual toner is spread by the force receiving portion b2 rotating inside the storage container 18. Therefore, even if transfer residual toner accumulates at the force receiving portion b2, the transfer residual toner is spread to outside the force receiving portion b2 and, therefore, does not contribute to a rise of the load Fr, which the conveyance member 18*b* receives when rotating.

However, in the state in which the amount of conveyed transfer residual toner is large as illustrated in FIG. 11D, the filling density of toner in the storage container 18 is high. Therefore, even if the force receiving portion b2 tries to spread transfer residual toner conveyed by the conveyance portion b1, since transfer residual toner has already arrived at the four wall surfaces of the storage container 18, the transfer residual toner remains without being spread by the force receiving portion b2. As a result, transfer residual toner conveyed by the conveyance portion b1 enables causing a rotational resistance in the force receiving portion b2 to rapidly rise and enables causing the load Fr, which the conveyance member 18*b* receives when rotating, to rapidly rise.

As illustrated in FIG. 12, in the configuration of the first exemplary embodiment, which has the force receiving portion b2, in the full-storage detection range ΔQ, the load range ΔFrp in the first exemplary embodiment, which is determined in consideration of a variation of the load Fr, rapidly rises and thus exceeds the frictional force range ΔFm. This enables, even in consideration of the frictional force range ΔFm which is set based on variations in component accuracy and friction coefficient, detecting a full-storage state of the storage container 18 with a high degree of accuracy with use of a simplified configuration as in the first exemplary embodiment.

Figure 13:
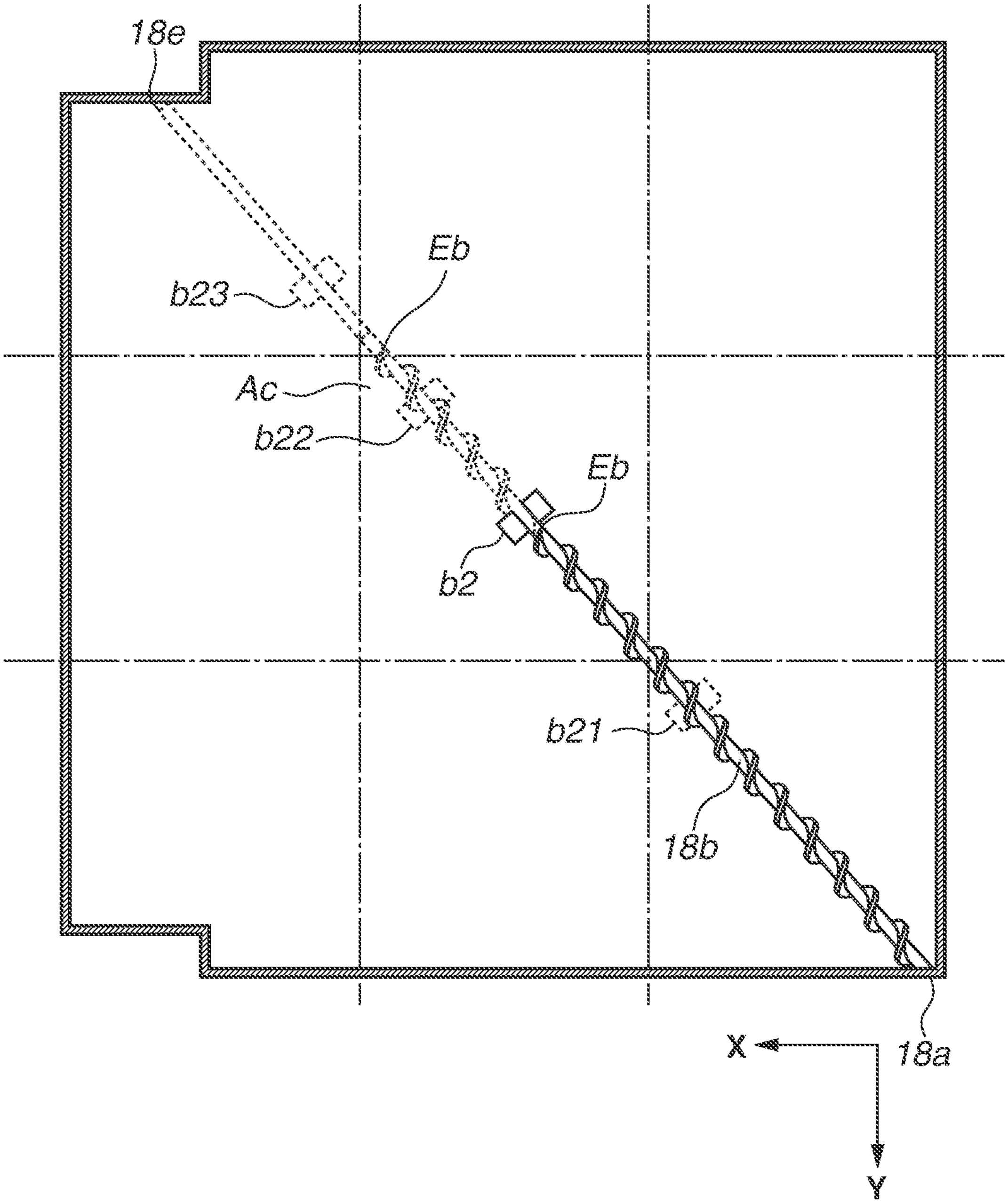
FIG. 13 is a schematic view illustrating a modification example of a position at which a force receiving portion is provided in the first exemplary embodiment.

Furthermore, with regard to the location of the force receiving portion b2, the force receiving portion b2 being provided on the immediately downstream side of the end portion Eb of the conveyance portion b1 with respect to the rotational axis direction of the conveyance member 18*b* is effective for causing a rise in the load Fr. However, the first exemplary embodiment is not limited to this location, as illustrated in FIG. 13, the location at which the force receiving portion b2 is provided can be set as appropriate in view of various constituent elements of the transfer unit 11 or adjustment of the degree of rise of the load Fr. FIG. 13 is a schematic view illustrating a modification example of the location at which a force receiving portion is provided in the first exemplary embodiment.

For example, as illustrated in FIG. 13, in a case where a force receiving portion b21 is provided at a position close to the inflow port 18*a* in a region in which the conveyance portion b1 is provided, transfer residual toner which is conveyed by the conveyance member 18*b* is spread on the way by the force receiving portion b21. As a result, since a configuration in which transfer residual toner is spread in a concentric fashion at two locations, i.e., a halfway point of the conveyance portion b1 and the end portion Eb, is obtained, it becomes possible to optionally set detection timing at which to detect a full-storage state of the storage container 18 depending on the location of the force receiving portion b21.

On the other hand, a force receiving portion can be provided at a side close to the wall surface 18*e* in the storage container 18, as with a force receiving portion b22 or a force receiving portion b23. In this case, when the filling rate of toner at a position away from the end portion Eb exceeds a predetermined filling rate, the force receiving portion b22 or the force receiving portion b23 starts to act. In other words, the force receiving portion b22 or the force receiving portion b23 acts at a position where the filling density of toner is relatively lower than that in the central area Ac of the storage container 18, in which the end portion Eb is located. As a result, as compared with a case where the force receiving portion b22 or the force receiving portion b23 is provided in the vicinity of the end portion Eb, the load range ΔFrp exceeds the frictional force range ΔFm at later timing. In this way, it becomes possible to optionally set detection timing at which to detect a full-storage state of the storage container 18 depending on the location of the force receiving portion b22 or the force receiving portion b23.

Additionally, as mentioned above, the location at which to locate the end portion Eb is desired to be the central area Ac of the storage container 18 but can be optional. Appropriately setting the locations of the end portion Eb and the force receiving portion b2 enables controlling the center location at which to spread transfer residual toner inside the storage container 18 or the timing at which to detect a full-storage state of the storage container 18.

Moreover, in providing the force receiving portion b2, it is favorable that the storage container 18 is located in approximately the horizontal direction with respect to the bottom surface of the image forming apparatus 1. Employing such a configuration allows a gravitational force to approximately perpendicularly act on the surface of the lower-side member 18*d* of the storage container 18, which supports transfer residual toner. At this time, transfer residual toner which has been conveyed to the vicinity of the end portion Eb by the conveyance portion b1 becomes likely to remain near the force receiving portion b2. As a result, since it becomes possible to cause the load Fr to rapidly rise in the full-storage detection range ΔQ, it becomes possible to detect a full-storage state of the storage container 18 at more accurate timing.

<Shape of Force Receiving Portion and Modification Examples>

Figure 14A:
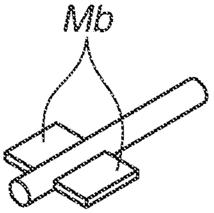
FIGS. 14A, 14B, 14C, 14D, 14E, 14F, 14G, and 14H are schematic views illustrating modification examples of the force receiving portion in the first exemplary embodiment.

Next, the shape of the force receiving portion b2 in the first exemplary embodiment and modification examples for enhancing an effect produced by the force receiving portion b2 are described with reference to FIGS. 14A, 14B, 14C, 14D, 14E, 14F, 14G, and 14H. FIG. 14A is a schematic view used to explain the shape of the force receiving portion b2 in the first exemplary embodiment, and FIGS. 14B to 14H are schematic views illustrating modification examples of the shape of the force receiving portion b2 in the first exemplary embodiment.

As illustrated in FIG. 14A, the force receiving portion b2 in the first exemplary embodiment is configured in such a manner that surfaces Mb used to agitate transfer residual toner are in the shape of a flat plate perpendicular to the rotational axis direction of the conveyance member 18*b*. In this configuration, unlike the conveyance portion b1, which is used to convey transfer residual toner along the rotational axis direction, the force receiving portion b2 does not have a conveyance force for conveying transfer residual toner along the rotational axis direction. Accordingly, since controlling the area on which to form the surfaces Mb enables controlling the volume of transfer residual toner which the force receiving portion b2 spreads according to rotation of the conveyance member 18*b*, it is possible to more easily adjust the full-storage detection range ΔQ. Moreover, since the surfaces Mb are not complicated in shape, when the conveyance member 18*b* is formed with use of a mold, a simplified mold structure can be employed for such formation.

Figure 14D:
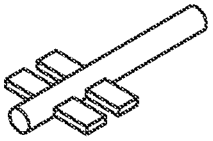
Figure 14G:
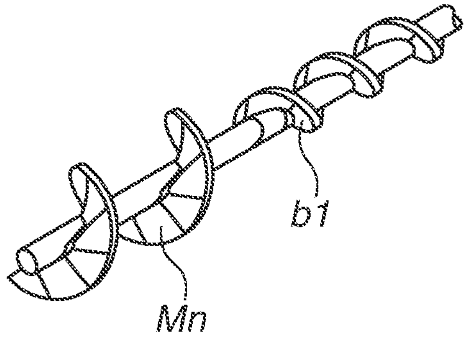
Figure 14B:
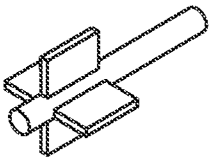

The configuration of the force receiving portion b2 is not limited to the above-mentioned configuration, but can be, for example, a configuration obtained by increasing the number of surfaces formed in the shape of a flat plate from two to four as illustrated in FIG. 14B. Employing such a configuration enables reducing a force imposed on each surface of the force receiving portion and thus enables giving freedom in selection of a material configuring the force receiving portion or the thickness of each surface. Furthermore, the number of flat-plate shaped surfaces of the force receiving portion is not limited to the numbers of surfaces illustrated in FIGS. 14A and 14B, but can be optionally selected depending on the configuration of the force receiving portion.

Figure 14E:
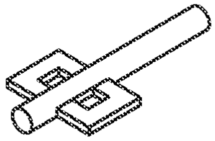
Figure 14H:
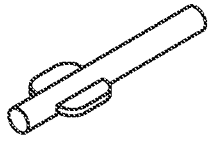
Figure 14C:
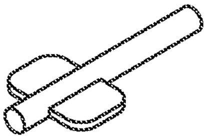

Moreover, as illustrated in FIG. 14C, a configuration obtained by rounding the corner portions of the flat-plate shaped configuration of the force receiving portion b2 can be employed. This enables reducing damage to corner portions of the force receiving portion caused by, for example, variation in the viscosity or size of transfer residual toner and thus enables improving the durability of the force receiving portion. Here, the area of surfaces of the force receiving portion b2 can be set as appropriate depending on the setting size of a load range for use in detecting a full-storage state of the storage container 18, and, for example, the area can be set small as illustrated in FIG. 14H.

Additionally, as illustrated in FIG. 14D, the flat-plate shaped configuration can be divided into a plurality of configurations on the same plane. In this way, dividing each surface which receives a force from transfer residual toner into a plurality of parts and providing an air gap portion between the parts enables moderately allowing transfer residual toner to escape via the air gap portion. This enables preventing, for example, a malfunction of the force receiving portion which is caused by transfer residual toner being firmly fixed to the flat-plate shaped surface. Furthermore, the air gap portion which is formed in the flat-plate shaped surface of the force receiving portion is not limited to the configuration illustrated in FIG. 14D, but can be formed by, as illustrated in FIG. 14E, forming a hole shape in a single flat-plate shaped surface. Providing such a hole shape enables further providing, in addition to the advantageous effect of preventing the malfunction caused by firm fixing of transfer residual toner as illustrated in FIG. 14D, a portion formed by a continuous flat-plate shaped surface and thus enables improving the strength of the force receiving portion.

Figure 14F:
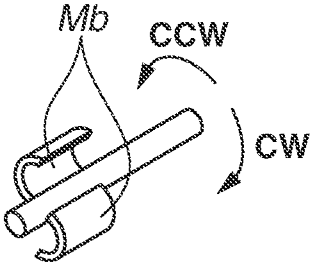

Furthermore, a configuration in which, as illustrated in FIG. 14F, the surface of the force receiving portion b2 which receives a force has a shape which is not a flat-plate shape perpendicular to the rotational direction of the conveyance member 18*b*, for example, the cross-section of the force receiving portion b2 as viewed from the rotational axis direction of the conveyance member 18*b* has an arc-like shape, can be employed. When the force receiving portion b2 having a shape illustrated in FIG. 14F is rotated in a clockwise (CW) direction, since the surfaces Mb of the force receiving portion b2 become inward-directed arc-like shapes with respect to the rotational direction, transfer residual toner becomes likely to be held by the surfaces Mb. This enables raising a load which the force receiving portion b2 receives without enlarging the area of the surfaces Mb of the force receiving portion b2 which receives a force, and thus enables attaining an improvement in the degree of structural freedom and a reduction in cost.

In the configuration illustrated in FIG. 14F, when the force receiving portion b2 is rotated in a counterclockwise (CCW) direction, since the surfaces Mb of the force receiving portion b2 become outward-directed arc-like shapes with respect to the rotational direction, transfer residual toner becomes likely to escape from the surfaces Mb. This configuration enables, without enlarging the area of the surfaces Mb of the force receiving portion b2 which receives a force, reducing transfer residual toner being firmly fixed to the surfaces Mb of the force receiving portion b2. Furthermore, in FIG. 14F, a configuration in which the cross-section of the force receiving portion b2 has an arc-like shape as viewed from the rotational axis direction of the conveyance member 18*b* is illustrated. However, the first exemplary embodiment is not limited to this, and the force receiving portion b2 can be configured with use of an optional shape which is not a flat-plate shape perpendicular to the rotational direction of the conveyance member 18*b* as a surface at which the force receiving portion b2 receives a force, depending on the setting size of a load range for use in detecting a full-storage state of the storage container 18. Moreover, the number of surfaces Mb to be formed can be optionally set depending on the setting size of a load range for use in detecting a full-storage state of the storage container 18.

As illustrated in FIG. 14G, the configuration of the force receiving portion b2 can include a configuration having a twist-form surface Mn similar to the shape of the conveyance portion b1 with respect to the rotational axis direction of the conveyance member 18*b*. More specifically, referring to FIG. 14G, a twisting direction of the surface Mn of the force receiving portion b2 is made reverse to a twisting direction of the conveyance portion b1, and the direction in which the force receiving portion b2 conveys transfer residual toner is made opposite to the conveyance direction of the conveyance portion b1. This enables the force receiving portion b2 to apply, to transfer residual toner conveyed from the conveyance portion b1, a conveyance force in a direction opposite to the conveyance direction of the conveyance portion b1 for transfer residual toner. Then, additionally, a configuration in which the diameter of the surface Mn as viewed from the rotational axis direction of the conveyance member 18*b* is made larger than the diameter of the conveyance portion b1 to increase a conveyance performance is employed. As a result, when the conveyance member 18*b* rotates, a load which the surface Mn receives becomes larger than a load which the conveyance portion b1 receives, it is possible to raise a load which the conveyance member 18*b* receives when rotating. Furthermore, for example, the size or twisting direction of the surface Mn of the force receiving portion b2 can be optionally set depending on the setting size of a load range for use in detecting a full-storage state of the storage container 18.

While, in the first exemplary embodiment, a configuration in which a metallic roller, which is more expensive, is used as each primary transfer roller 16 has been described, the first exemplary embodiment is not limited to this configuration. Examples of a transfer member to be used can include a roller member having a conductive elastic layer, a conductive sheet member, and a conductive brush member. Moreover, in a case where the above-mentioned transfer member, such as a roller having a conductive elastic layer, is used, the transfer member can be located at a position shifting relative to each primary transfer portion, or can be located immediately below each primary transfer member.

In the above-described first exemplary embodiment, a configuration in which the storage container 18 for storing transfer residual toner is provided inside the transfer unit 11, i.e., in a region configured with the inner circumferential surface of the intermediate transfer belt 12, has been described. On the other hand, a second exemplary embodiment differs from the first exemplary embodiment in that a storage container 118 for storing transfer residual toner is provided not inside the inner circumferential surface of the intermediate transfer belt 12 but outside the transfer unit 11. Furthermore, in the second exemplary embodiment, the configuration of an image forming apparatus is substantially the same as that in the first exemplary embodiment except for the placement location of the storage container 118. Accordingly, in the following description, portions which are in common with those in the first exemplary embodiment are assigned the respective same reference characters as those in the first exemplary embodiment, and are omitted from description here.

Figure 15:
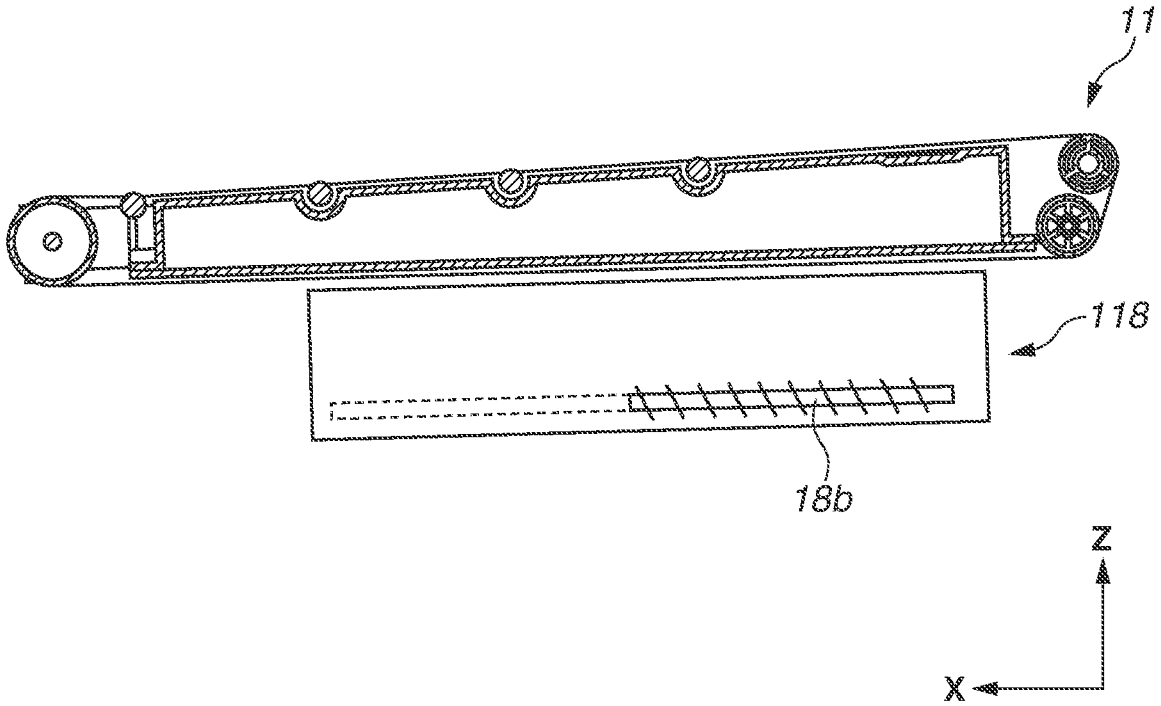
FIG. 15 is a schematic view illustrating a configuration of a second exemplary embodiment.

FIG. 15 is a schematic view used to explain the location of the storage container 118 in the second exemplary embodiment. As illustrated in FIG. 15, the storage container 118 is located below the bottom surface of the transfer unit 11 with respect to the Z-axis direction. In this way, providing the storage container 118 outside the transfer unit 11 enables, while maintaining the filling performance for transfer residual toner such as that described in the first exemplary embodiment, attaching and detaching only the storage container 118 to and from the image forming apparatus 1. Thus, in the configuration of the second exemplary embodiment, it is possible to replace the storage container 118 irrespective of the component life of the transfer unit 11.

Furthermore, while, in the above-described exemplary embodiments, the image forming apparatus 1 of the intermediate transfer type using the intermediate transfer belt 12 has been described, the above-described exemplary embodiments are not limited to this. Even in an image forming apparatus of the direct transfer type having a conveyance belt for conveying the transfer material P, using the transfer residual toner recovery configuration described in the above-described exemplary embodiments enables attaining advantageous effects similar to those in the above-described exemplary embodiments.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A belt unit for use in an image forming apparatus, the belt unit comprising:

an endless belt configured to be movable in a movement direction;

a transfer member configured to contact with an inner circumferential surface of the endless belt;

a collecting member configured to collect toner on an outer circumferential surface of the endless belt by contacting with the outer circumferential surface of the endless belt;

a storage container including a receiving port through which the toner collected by the collecting member is to be received; and a conveyance member configured to convey, inside the storage container, the toner which is to be received through the receiving port in a conveyance direction, wherein the conveyance member is configured to be rotated about a rotational axis extending in a rotational axis direction, includes a shaft and a conveyance portion which is provided on an outer surface of the shaft shaft, and has a helical shape in which a helical axis extends in the rotational axis direction, and wherein the conveyance member further includes a protruding portion which protrudes from the outer surface of the shaft in a direction crossing the rotational axis of the conveyance member, which has a shape different from the helical shape of the conveyance portion, and which is provided on a portion of the shaft downstream of the conveyance portion in the conveyance direction.

2. The belt unit according to claim 1, wherein athe shape of the protruding portion is configured in such a manner that, while the conveyance member is being rotated, a rotational load that the protruding portion receives is higher than a rotational load that the conveyance portion receives.

3. The belt unit according to claim 1, wherein the protruding portion has a surface configured to agitate toner conveyed by the conveyance portion, and wherein the surface of the protruding portion extends in both the rotational axis direction of the conveyance member and a direction perpendicular to the rotational axis of the conveyance member.

4. The belt unit according to claim 1, further comprising:

a driving rotation member configured to suspend the endless belt in a tensioned manner and to move the endless belt by rotating upon receiving a driving force; and a driving coupling member configured to transmit a rotative force of the driving rotation member, wherein the conveyance member rotates in association with rotation of the driving rotation member by a gear provided at an end portion on a side of the receiving port and the driving coupling member engaging with each other.

5. The belt unit according to claim 1, wherein the storage container has a bottom surface configured to support the toner which is to be received through the receiving port, wherein a downstream end portion of the conveyance member in the conveyance direction includes a portion-to-be-supported supported by a supporting portion provided on the bottom surface of the storage container, and wherein the protruding portion is provided between the conveyance portion and the portion-to-be-supported in the rotational axis direction.

6. The belt unit according to claim 5, wherein the conveyance member has a region in which the conveyance portion is not provided between the protruding portion and the portion-to-be-supported in the rotational axis direction.

7. The belt unit according to claim 1, wherein the storage container has a bottom surface configured to support the toner which is to be received through the receiving port, and wherein the belt unit is attached to an apparatus body of the image forming apparatus so that the bottom surface of the storage container extends in an approximately horizontal direction.

8. The belt unit according to claim 1, wherein the storage container further includes a housing configured with an upper-side member provided on a side of the transfer member and a lower-side member provided on a side of a bottom surface of an apparatus body of the image forming apparatus, and wherein the conveyance member is provided inside the housing of the storage container configured by the upper-side member and the lower-side member joining together.

9. The belt unit according to claim 1, further comprising a detection unit configured to detect a load which the conveyance member receives while the conveyance member is being rotated.

10. The belt unit according to claim 1, wherein the belt unit is configured to be detachably attached to an apparatus body of the image forming apparatus.

11. The belt unit according to claim 1, wherein the protruding portion has a first protrusion and a second protrusion that are provided on the outer surface of the shaft, and the first protrusion is opposite to the second protrusion across the shaft in a direction perpendicular to the rotational axis of the conveyance member.

12. The belt unit according to claim 11, wherein a corner portion of the protruding portion is round and the protruding portion has a flat surface that extends in both the rotational axis direction and the direction perpendicular to the rotational axis of the conveyance member.

13. The belt unit according to claim 1, wherein the storage container is provided in a region surrounded by the inner circumferential surface of the endless belt.

14. The belt unit according to claim 1, wherein the rotational axis direction is a direction crossing both the movement direction of the endless belt and a longitudinal direction of the transfer member.

15. The belt unit according to claim 14, wherein, when the storage container is viewed while being projected on a horizontal plane in a direction perpendicular to both the movement direction of the endless belt and the longitudinal direction of the transfer member, (i)(a) a central area of the storage container, which is an area at which a movement middle area obtained as a result of equally dividing the storage container into three areas with respect to the movement direction of the endless belt, and (i)(b) a width middle area, obtained as a result of equally dividing the storage container into three areas with respect to the longitudinal direction of the transfer member, overlap each other, and (ii) an end portion of the conveyance portion provided on a side opposite to the receiving port with respect to the rotational axis direction is located in the central area.

16. The belt unit according to claim 1, wherein the protruding portion has a helical shape of which a helix direction is opposite to a helix direction of the helical shape of the conveyance portion.

17. An image forming apparatus comprising:

the belt unit according to claim 1 for use in the image forming apparatus; and an apparatus body including an image bearing member configured to bear a toner image and to contact with the outer circumferential surface of the endless belt of the belt unit, and including a second transfer member configured to contact with the endless belt of the belt unit, wherein, in transferring the toner image, the toner image is transferred from the image bearing member to the outer circumferential surface of the endless belt, and then the toner image is transferred, by the second transfer member, from the outer circumferential surface of the endless belt to a recording material, and wherein the collecting member collects toner remaining on the outer circumferential surface of the endless belt after the toner image is transferred from the outer circumferential surface of the endless belt to the recording material.

18. The image forming apparatus according to claim 17, further comprising a detection unit configured to detect a load which the conveyance member receives while the conveyance member is being rotated.

19. The image forming apparatus according to claim 17, wherein the belt unit is detachably attached to the apparatus body.

20. A belt unit for use in an image forming apparatus, the belt unit comprising:

an endless belt configured to be movable in a movement direction;

a transfer member configured to contact with an inner circumferential surface of the endless belt;

a collecting member configured to collect toner on an outer circumferential surface of the endless belt by contacting with the outer circumferential surface of the endless belt;

a storage container including a receiving port through which the toner collected by the collecting member is to be received; and a conveyance member configured to convey, inside the storage container, the toner which is to be received through the receiving port in a conveyance direction, wherein the conveyance member is configured to be rotated about a rotational axis extending in a rotational axis direction, includes a shaft and a conveyance portion which is provided on an outer surface of the shaft, and has a helical shape in which a helical axis extends in the rotational axis direction, wherein the conveyance member further includes a protruding portion which protrudes from the outer surface of the shaft in a direction crossing the rotational axis of the conveyance member, which has a shape different from the helical shape of the conveyance portion, and which is provided on a portion of the shaft downstream of the conveyance portion in the conveyance direction, wherein the storage container has a bottom surface configured to support the toner which is to be received through the receiving port, wherein a downstream end portion of the conveyance member in the conveyance direction includes a portion-to-be-supported supported by a supporting portion provided on the bottom surface of the storage container, and wherein the protruding portion is provided between the conveyance portion and the portion-to-be-supported in the rotational axis direction.

21. The belt unit according to claim 20, wherein the protruding portion has a first protrusion and a second protrusion that are provided on the outer surface of the shaft, and the first protrusion is opposite to the second protrusion across the shaft in a direction perpendicular to the rotational axis of the conveyance member.

22. The belt unit according to claim 21, wherein the protruding portion has a flat surface that extends in both the rotational axis direction and the direction perpendicular to the rotational axis of the conveyance member.

23. The belt unit according to claim 22, wherein a corner portion of the protruding portion is round.

24. The belt unit according to claim 20, wherein the storage container is provided in a region surrounded by the inner circumferential surface of the endless belt.

* * * * *